(12) United States Patent
Hayashi

(10) Patent No.: US 9,990,092 B2
(45) Date of Patent: Jun. 5, 2018

(54) TOUCH-DETECTION DEVICE, DISPLAY DEVICE HAVING A TOUCH-DETECTION FUNCTION, AND TOUCH-DETECTION METHOD

(71) Applicant: Japan Display Inc., Tokyo (JP)

(72) Inventor: Makoto Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 125 days.

(21) Appl. No.: 14/816,811

(22) Filed: Aug. 3, 2015

(65) Prior Publication Data

US 2016/0034070 A1    Feb. 4, 2016

(30) Foreign Application Priority Data

Aug. 4, 2014   (JP) ................... 2014-158431

(51) Int. Cl.
  *G06F 3/044* (2006.01)
  *G06F 3/041* (2006.01)
  *G09G 3/36* (2006.01)

(52) U.S. Cl.
  CPC .......... *G06F 3/044* (2013.01); *G06F 3/0412* (2013.01); *G06F 3/0416* (2013.01); *G09G 3/3622* (2013.01); *G09G 3/3681* (2013.01)

(58) Field of Classification Search
  CPC ...... G06F 3/041; G06F 3/0412; G06F 3/0416; G06F 3/044; G09G 3/36–3/3696
  See application file for complete search history.

(56) References Cited

U.S. PATENT DOCUMENTS

| 2008/0122798 | A1  | 5/2008  | Koshiyama et al. |
| 2008/0158167 | A1* | 7/2008  | Hotelling ............. G06F 3/0416 345/173 |
| 2010/0328259 | A1  | 12/2010 | Ishizaki et al. |
| 2011/0279364 | A1  | 11/2011 | Koshiyama et al. |
| 2012/0050216 | A1* | 3/2012  | Kremin .................. G06F 3/044 345/174 |

(Continued)

FOREIGN PATENT DOCUMENTS

| JP | 07-084712   | 3/1995 |
| JP | 2008-117371 | 5/2008 |

(Continued)

OTHER PUBLICATIONS

Japan Patent Office, Office Action for Japanese Patent Application No. 2014-158431 (related to above-captioned patent application), dated May 30, 2017.

*Primary Examiner* — Nathan Danielsen
(74) *Attorney, Agent, or Firm* — K&L Gates LLP

(57) ABSTRACT

In one embodiment, a touch-detection device includes first and second sensors, a driver and a detection circuit. The driver supplies a driving signal to the first and second sensors. The detection circuit detects an object which is in contact with a detection area, based on a detection signal which is read from the first and second sensors. The driver simultaneously supplies the signal to the first sensors in a first period, simultaneously supplies the signal to the second sensors in a second period following the first period, when the object was not detected in the first period, and successively supplies the signal to the respective first sensors in the second period, when the object was detected in the first period.

13 Claims, 13 Drawing Sheets

(56) References Cited

U.S. PATENT DOCUMENTS

| | | | |
|---|---|---|---|
| 2012/0050217 A1* | 3/2012 | Noguchi | G06F 3/0416 345/173 |
| 2012/0242608 A1 | 9/2012 | Koshiyama et al. | |
| 2013/0057507 A1 | 3/2013 | Shin et al. | |
| 2013/0215049 A1* | 8/2013 | Lee | G06F 3/0416 345/173 |
| 2014/0152605 A1 | 6/2014 | Koshiyama et al. | |
| 2014/0204060 A1 | 6/2014 | Ishizaki et al. | |

FOREIGN PATENT DOCUMENTS

| | | |
|---|---|---|
| JP | 2008-153025 | 7/2008 |
| JP | 2011-028721 | 2/2011 |
| JP | 2012-048295 A | 3/2012 |

\* cited by examiner

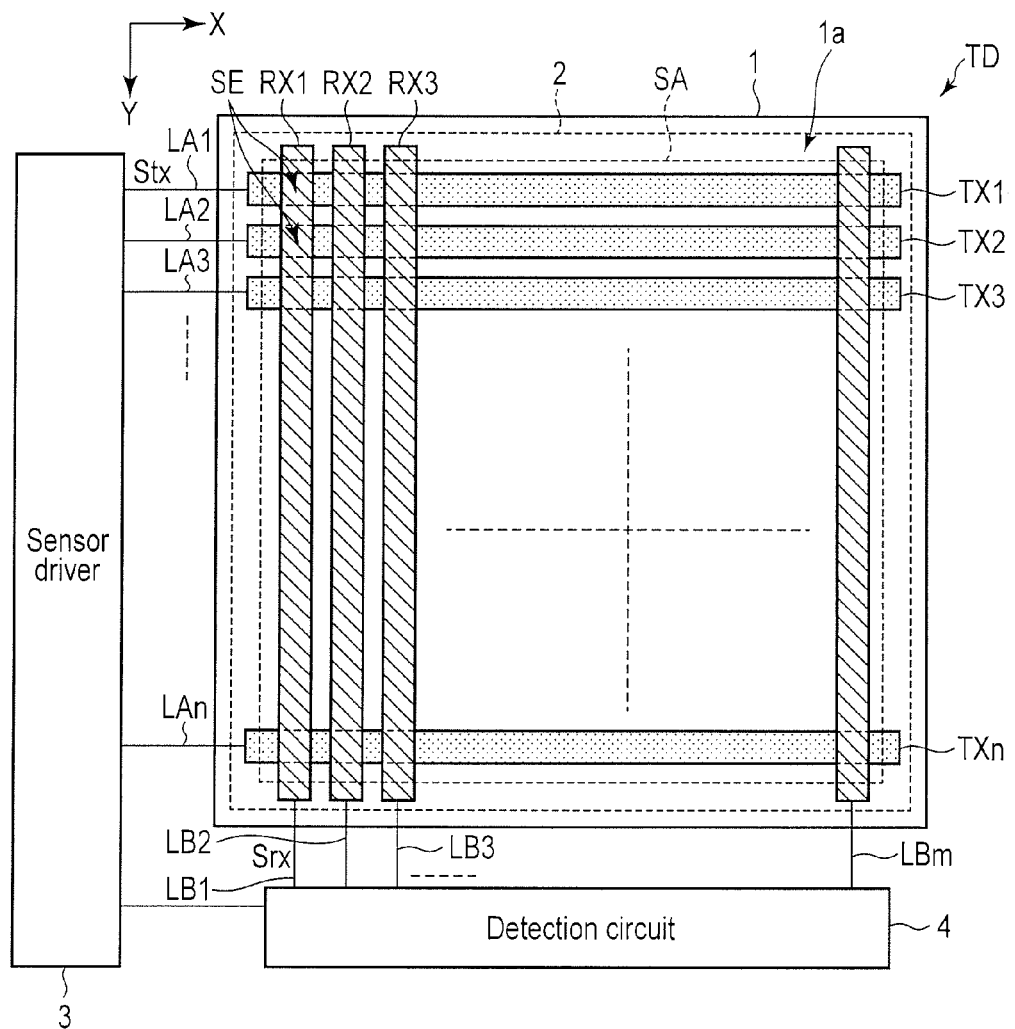
F I G. 1

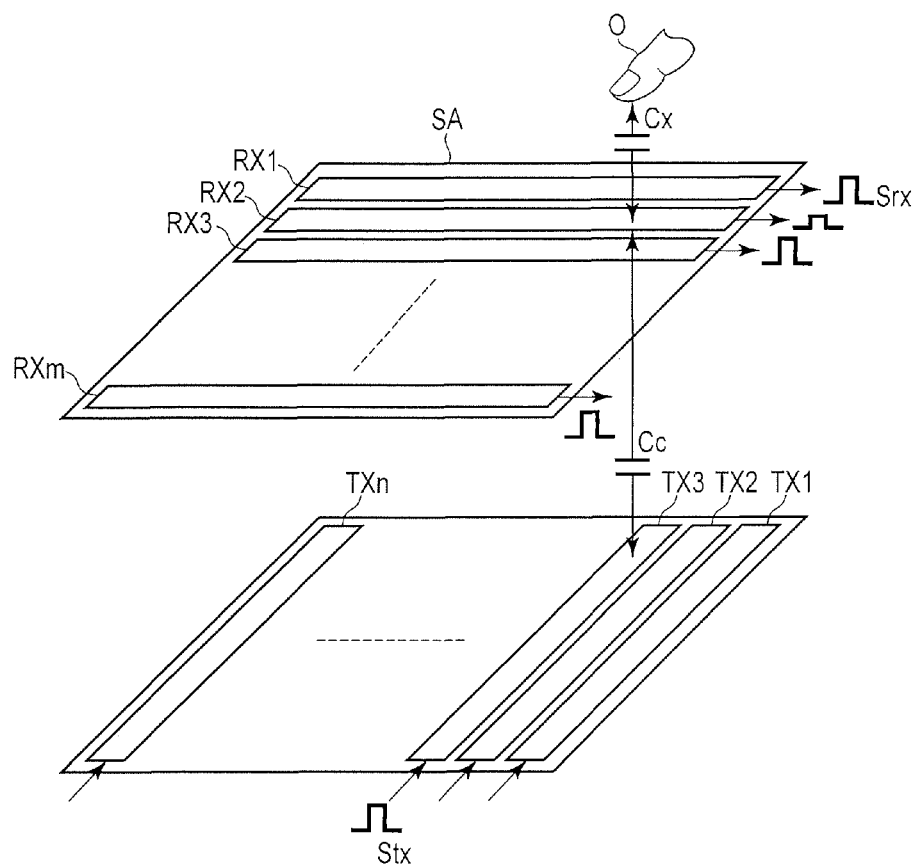
F I G. 2
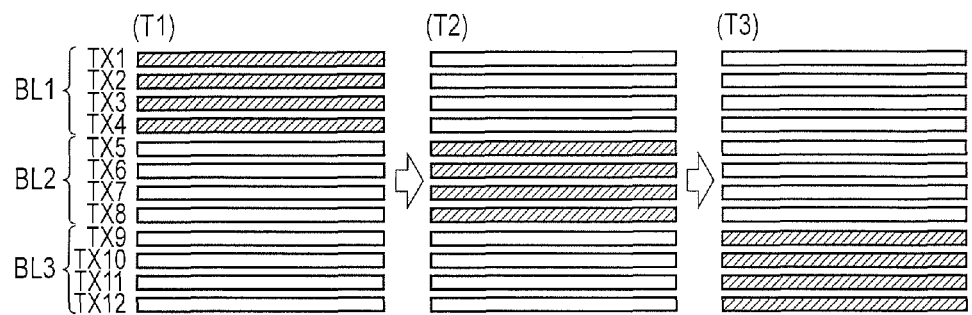
F I G. 3

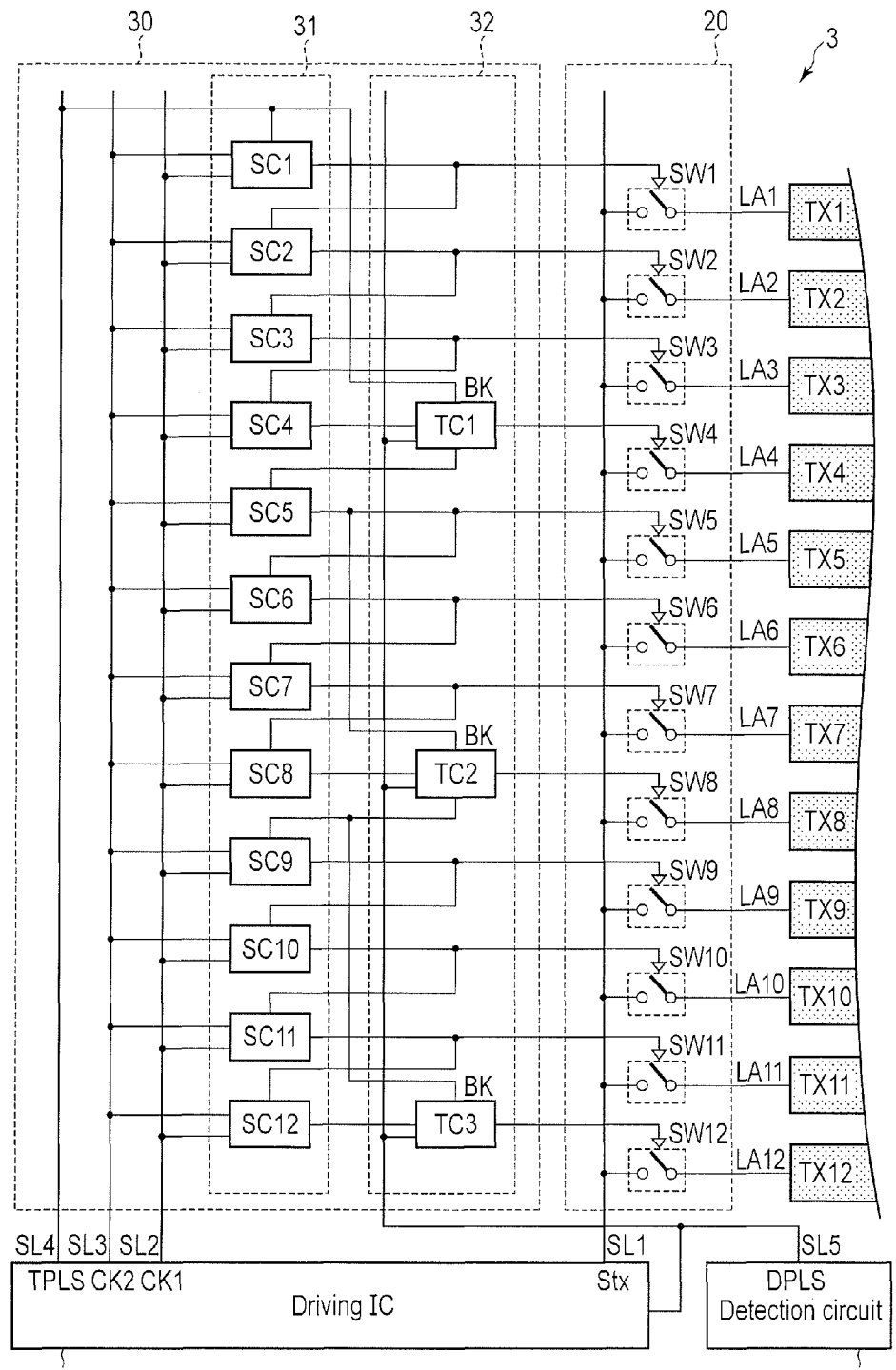
F I G. 7

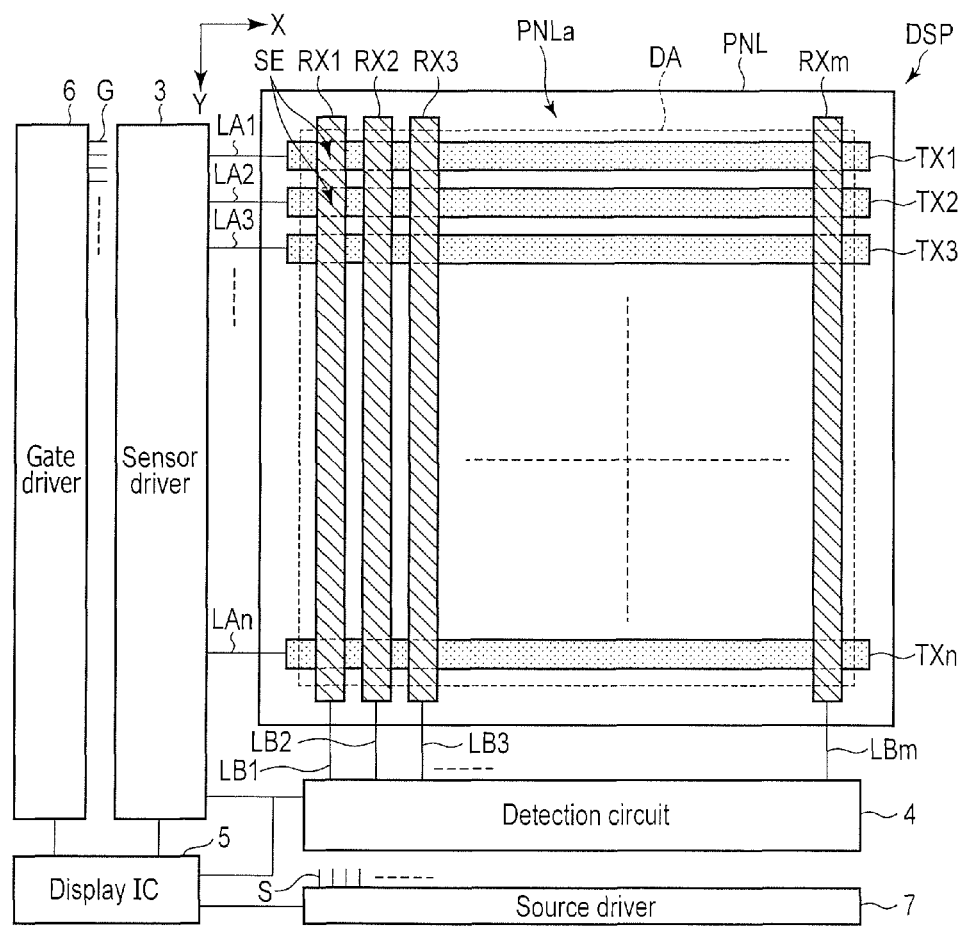
F I G. 9

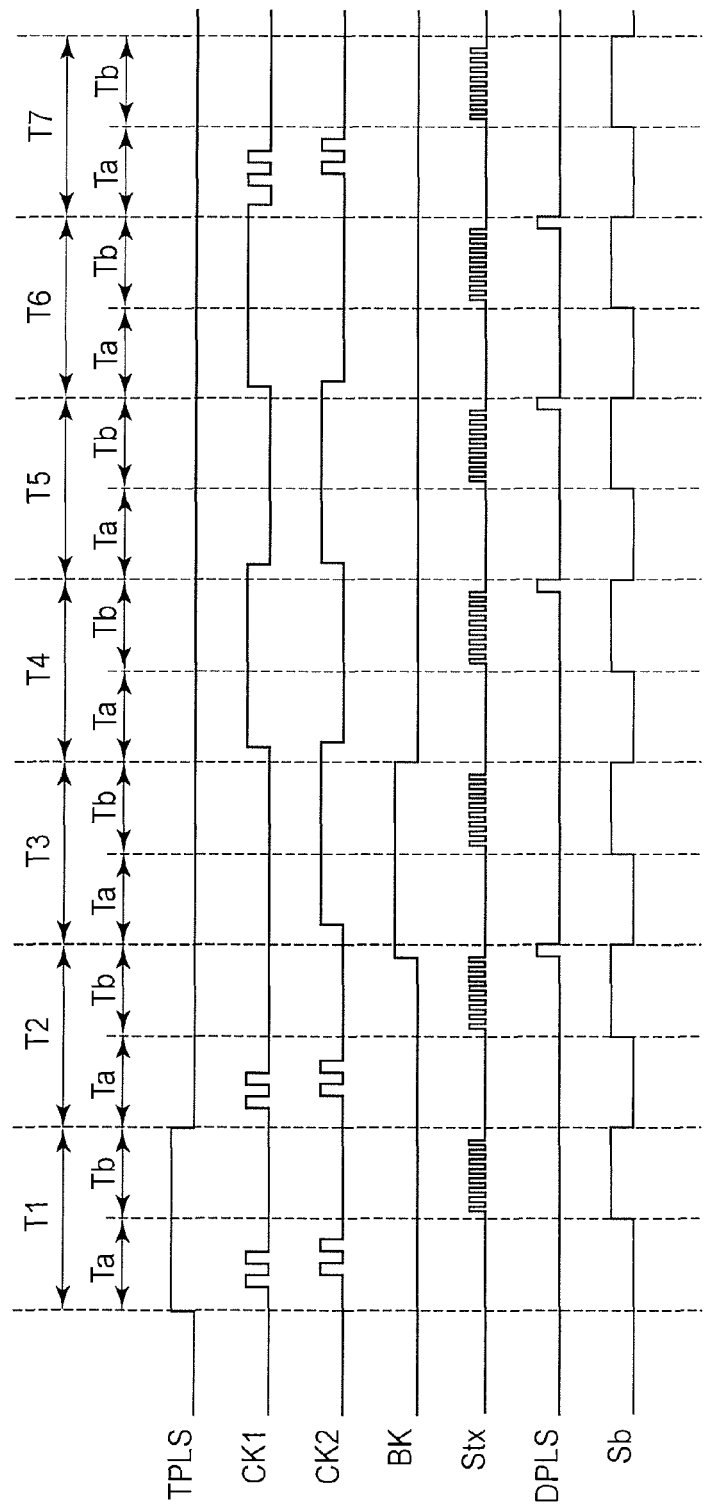
F I G. 13

TOUCH-DETECTION DEVICE, DISPLAY DEVICE HAVING A TOUCH-DETECTION FUNCTION, AND TOUCH-DETECTION METHOD

CROSS REFERENCES TO RELATED APPLICATIONS

The present application claims priority to Japanese Priority Patent Application JP 2014-158431 filed in the Japan Patent Office on Aug. 4, 2014, the entire content of which is hereby incorporated by reference.

FIELD

Embodiments described herein relate generally to a touch-detection device, a display device having a touch-detection function, and a touch-detection method.

BACKGROUND

A touch-detection device, which is utilized as, for instance, an input device of electronic equipment including a display device, includes, for example, a plurality of driving electrodes to which a driving signal is successively supplied, and a detection electrode which forms a capacitance between the driving electrode and itself, and detects an object which is in contact with, or in close proximity to, a detection surface, based on a signal obtained from the detection electrode.

In this kind of touch-detection device, the area of a detection surface corresponding to one driving electrode decreases by increasing the number of driving electrodes, and thus the detection precision (detection resolution) can be enhanced. However, if the number of driving electrodes is increased, a time increases until completing one-time sensing of the detection surface by successively supplying the driving signal to all driving electrodes.

An object of an embodiment of the present disclosure is to provide a touch-detection device, a display device having a touch-detection function, and a touch-detection method, which can shorten a time that is needed for detection, while maintaining detection precision.

SUMMARY

This application relates generally to a display device.

In an embodiment, a touch-detection device is provided, comprising a plurality of first sensors; a plurality of second sensors; a driver configured to supply a driving signal to the first sensors and the second sensors; and a detection circuit configured to read a detection signal from the first sensors and the second sensors, and to detect an object, which is in contact with, or in close proximity to, a detection area, based on the detection signal, wherein the driver is configured to simultaneously supply the driving signal to the first sensors in a first period, to simultaneously supply the driving signal to the second sensors in a second period following the first period, when the object was not detected by the detection circuit in the first period, and to successively supply the driving signal to the respective first sensors in the second period, when the object was detected by the detection circuit in the first period.

In a further embodiment, a display device is provided, having a touch-detection function comprising: a display panel including a display element, a plurality of pixel electrodes disposed in a display area, and a plurality of first driving electrodes and a plurality of second driving electrodes which are opposed to the pixel electrodes; a detection electrode opposed to the first driving electrodes and the second driving electrodes; a detection circuit configured to read a detection signal from the detection electrode, and to detect an object, which is in contact with, or in close proximity to, the display area, based on the detection signal; and a driver configured to set, at a time of image display, the first driving electrodes and the second driving electrodes at a common potential for display, and to supply, at a time of detection of the object, a driving signal for detection to the first driving electrodes and the second driving electrodes, wherein the driver is configured to simultaneously supply the driving signal to the first driving electrodes in a first period, to simultaneously supply the driving signal to the second driving electrodes in a second period following the first period, when the object was not detected by the detection circuit in the first period, and to successively supply the driving signal to the respective first driving electrodes in the second period, when the object was detected by the detection circuit in the first period.

In a further embodiment, a touch-detection method of supplying a driving signal to a plurality of first sensors and a plurality of second sensors and detecting an object, which is in contact with, or in close proximity to, a detection area, based on a detection signal obtained from the first sensors and the second sensors is provided, the method comprising: simultaneously supplying the driving signal to the plurality of first sensors in a first period; simultaneously supplying the driving signal to the plurality of second sensors in a second period following the first period, when the object was not detected in the first period; and successively supplying the driving signal to the respective first sensors in the second period, when the object was detected in the first period.

Additional features and advantages are described herein, and will be apparent from the following Detailed Description and the figures.

BRIEF DESCRIPTION OF THE FIGURES

FIG. 1 is a view which schematically illustrates a configuration example of a touch-detection device according to a first embodiment.

FIG. 2 is a view for explaining a principle of sensing by the touch-detection device.

FIG. 3 is a view illustrating an example of a sensing operation in a case in which there is no object which is in contact with, or in close proximity to, a detection area of the touch-detection device.

FIG. 7 is a view illustrating an example of a circuit configuration which is applicable to a sensor driver which the touch-detection device includes.

FIG. 9 is a view which schematically illustrates a configuration example of a display device having a touch-detection function according to a second embodiment.

FIG. 13 is a timing chart illustrating an example of the operation of the sensor driver and display IC of the display device having a touch-detection function.

DETAILED DESCRIPTION

Figure 4:
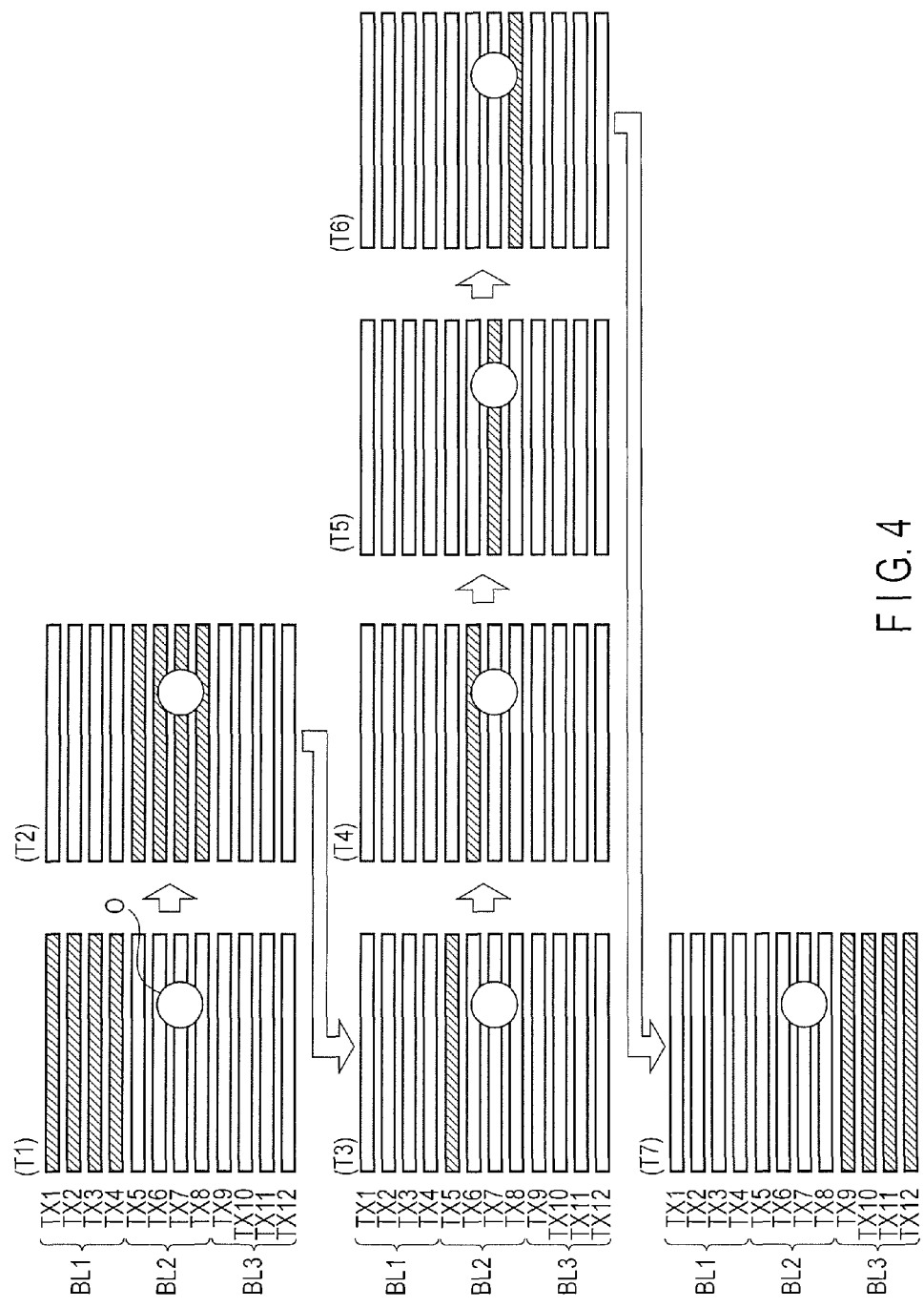
FIG. 4 is a view illustrating an example of a sensing operation in a case in which there is an object which is in contact with, or in close proximity to, the detection area.

Some embodiments will be described hereinafter with reference to the accompanying drawings.

In general, according to one embodiment, a touch-detection device includes a plurality of first sensors, a plurality of second sensors, a driver, and a detection circuit. The driver is configured to supply a driving signal to the first sensors and the second sensors. The detection circuit is configured to read a detection signal from the first sensors and the second sensors, and to detect an object, which is in contact with, or in close proximity to, a detection area, based on the detection signal. Further, the driver is configured to simultaneously supply the driving signal to the plurality of first sensors in a first period, to simultaneously supply the driving signal to the plurality of second sensors in a second period following the first period, when the object was not detected by the detection circuit in the first period, and to successively supply the driving signal to the respective first sensors in the second period, when the object was detected by the detection circuit in the first period.

According to another embodiment, a display device having a touch-detection function includes a display panel, a detection electrode, a detection circuit, and a driver. The display panel includes a display element, a plurality of pixel electrodes disposed in a display area, and a plurality of first driving electrodes and a plurality of second driving electrodes which are opposed to the plurality of pixel electrodes. The detection electrode is opposed to the first driving electrodes and the second driving electrodes. The detection circuit is configured to read a detection signal from the detection electrode, and to detect an object, which is in contact with, or in close proximity to, the display area, based on the detection signal. The driver is configured to set, at a time of image display, the first driving electrodes and the second driving electrodes at a common potential for display, and to supply, at a time of detection of the object, a driving signal for detection to the first driving electrodes and the second driving electrodes. Further, the driver is configured to simultaneously supply the driving signal to the plurality of first driving electrodes in a first period, to simultaneously supply the driving signal to the plurality of second driving electrodes in a second period following the first period, when the object was not detected by the detection circuit in the first period, and to successively supply the driving signal to the respective first driving electrodes in the second period, when the object was detected by the detection circuit in the first period.

According to another embodiment, a touch-detection method includes supplying a driving signal to a plurality of first sensors and a plurality of second sensors and detecting an object, which is in contact with, or in close proximity to, a detection area, based on a detection signal obtained from the first sensors and the second sensors. The method includes simultaneously supplying the driving signal to the plurality of first sensors in a first period, simultaneously supplying the driving signal to the plurality of second sensors in a second period following the first period, when the object was not detected in the first period, and successively supplying the driving signal to the respective first sensors in the second period, when the object was detected in the first period.

The disclosure in each embodiment is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. In some cases, in each of the drawings, reference numbers of identical or similar elements, which are successively disposed, are omitted. In addition, in the specification and drawings, the structural elements, which have functions identical or similar to the functions described in connection with preceding drawings, are denoted by like reference numbers, and an overlapping detailed description thereof is omitted unless otherwise necessary.

First Embodiment

In a first embodiment, a capacitive touch-detection device and a touch-detection method using by this touch-detection device are disclosed. This touch-detection device can be used, for example, as an input device of a display device.

FIG. 1 is a view which schematically illustrates a configuration example of the touch-detection device. A touch-detection device TD illustrated includes a sensor substrate 1, n (n is a positive integer) driving electrodes TX (TX1 to TXn), an insulation layer 2, and m (m is a positive integer) detection electrodes RX (RX1 to RXm).

The sensor substrate 1 is, for example, an insulative substrate formed of glass or a transparent resin material. In the example of FIG. 1, the sensor substrate 1 has a rectangular shape with side portions extending in a first direction X and in a second direction Y which intersects at right angles with the first direction X. The sensor substrate 1 has a principal surface 1a including a detection area SA. Incidentally, the first direction and second direction Y may cross at an acute angle (or an obtuse angle).

Driving electrodes TX1 to TXn are provided on the principal surface 1a of the sensor substrate 1. In the example of FIG. 1, driving electrodes TX1 to TXn extend in strip shapes in the first direction X in the detection area SA, and are arranged in the second direction Y.

The insulation layer 2 is formed of, for example, a transparent resin material, and covers driving electrodes TX1 to TXn, and a part of the principal surface 1a.

Detection electrodes RX1 to RXm are provided on the insulation layer 2, and are opposed to respective driving electrodes TX1 to TXn via the insulation layer 2. In the example of FIG. 1, detection electrodes RX1 to RXm extend in strip shapes in the second direction Y in the detection area SA, and are arranged in the first direction X.

Driving electrodes TX1 to TXn and detection electrodes RX1 to RXm are formed of a transparent, electrically conductive material such as indium tin oxide (ITO) or indium zinc oxide (IZO). By forming driving electrodes TX1 to TXn and detection electrodes RX1 to RXm of such a transparent, electrically conductive material, the visibility of an image, which is displayed on the screen, can be secured even in the case in which the touch-detection device TD is disposed on the screen of a display device.

In the meantime, one driving electrode TX and one detection electrode RX constitute a sensor SE that is a basic unit of sensing.

The touch-detection device TD further includes a sensor driver 3 which is connected to driving electrodes TX1 to TXn via lead lines LA (LA1 to LAn), and a detection circuit 4 which is connected to detection electrodes RX1 to RXm via lead lines LB (LB1 to LBm).

The sensor driver 3 supplies driving signals Stx to driving electrodes TX1 to TXn via lead lines LA1 to LAn. In synchronism with the supply of the driving signals Stx by the sensor driver 3, the detection circuit 4 reads detection signals Srx from detection electrodes RX1 to RXm via lead lines LB1 to LBm. The sensor driver 3 and detection circuit 4 may be provided on the sensor substrate 1. Alternatively, the sensor driver 3 and detection circuit 4 may be provided separately from the sensor substrate 1, and may be connected to driving electrodes TX1 to TXn and detection electrodes RX1 to RXm via pads provided on the sensor substrate 1 or a flexible wiring board connected to the pads. In this case, lead lines LA1 to LAn, and LB1 to LBm illustrated in FIG. 1 are composed of the above-described pads, wiring lines connecting the pads and driving electrodes TX1 to TXn and detection electrodes RX1 to RXm, and the above-described flexible wiring board.

FIG. 2 is a view for explaining a principle of sensing by the touch-detection device TD. A capacitance Cc exists between the driving electrode TX and detection electrode RX. If a driving signal Stx is supplied to the driving electrode TX, an electric current flows to the detection electrode RX via capacitance Cc, and thus a detection signal Srx is obtained from the detection electrode RX. The driving signal Stx is, for example, a rectangular pulse, and the detection signal Srx is a rectangular pulse of a voltage corresponding to the driving signal Stx.

If an object O, which is a conductor such as a user's finger, approaches the touch-detection device TD, a capacitance Cx occurs between the detection electrode RX, which is in close proximity to the object O, and the object O. When the driving signal Stx is supplied to the driving electrode TX, the waveform of the detection signal Srx, which is obtained from the detection electrode RX that is in close proximity to the object O, varies by being affected by capacitance Cx. Specifically, based on the detection signals Srx obtained from detection electrodes RX1 to RXm, the detection circuit 4 shown in FIG. 1 can detect the object O that is in contact with, or in close proximity to, the detection area SA. In addition, based on the detection signal Srx obtained from detection electrodes RX1 to RXm at each time phase when the driving signal Stx is successively supplied to driving electrodes TX1 to TXn in a time division manner, two-dimensional position information of the object O in the detection area SA can be detected.

Next, an example of the operation of the touch-detection device TD is described.

By dividing an n driving electrodes TX into a plurality of blocks BL each including at least two driving electrodes TX, the sensor driver 3 repeatedly executes a sensing operation of supplying a driving signal Stx in units of the block BL. In addition, when the detection circuit 4 has detected the object in association with the supply of the driving signal Stx to any one of the blocks BL, the sensor driver 3 individually supplies, immediately thereafter, the driving signal to each of the driving electrodes TX which constitute this block BL.

A concrete example of this sensing operation is described with reference to FIG. 3 and FIG. 4. Here, the case is assumed in which the touch-detection device TD includes 12 (n=12) driving electrodes TX1 to TX12, driving electrodes TX1 to TX4 constitute a block BL1, driving electrodes TX5 to TX8 constitute a block BL2, and driving electrodes TX9 to TX12 constitute a block BL3. Incidentally, the number of driving electrodes TX, the number of blocks BL, and the number of driving electrodes TX included in one block BL are not limited to examples described here. In addition, the numbers of driving electrodes TX included in the respective blocks BL do not necessarily need to be equal. For example, it is possible to adopt a configuration in which the respective blocks include different numbers of driving electrodes TX, such as a configuration in which the number of driving electrodes TX of an odd-numbered block BL, as counted from above, is greater by one than the number of driving electrodes TX of an even-numbered block BL.

FIG. 3 is a view illustrating an example of a sensing operation in a case in which there is no object which is in contact with, or in proximity to, the detection area SA. This sensing operation includes operations which are executed in a period T1, a period T2 and a period T3, respectively. Periods T1 to T3 are, for example, periods of the same length.

In period T1, the sensor driver 3 simultaneously supplies a driving signal Stx to driving electrodes TX1 to TX4 which constitute block BL1. In addition, in synchronism with the supply of the driving signal Stx to driving electrodes TX1 to TX4, the detection circuit 4 reads a detection signal Srx from detection electrodes RX1 to RXm.

In period T2 following period T1, the sensor driver 3 simultaneously supplies the driving signal Stx to driving electrodes TX5 to TX8 which constitute block BL2. In addition, in synchronism with the supply of the driving signal Stx to driving electrodes TX5 to TX8, the detection circuit 4 reads the detection signal Srx from detection electrodes RX1 to RXm.

In period T3 following period T2, the sensor driver 3 simultaneously supplies the driving signal Stx to driving electrodes TX9 to TX12 which constitute block BL3. In addition, in synchronism with the supply of the driving signals Stx to driving electrodes TX9 to TX12, the detection circuit 4 reads the detection signal Srx from detection electrodes RX1 to RXm.

In the example of FIG. 3, since there is no object which is in contact with, or in proximity to, the detection area SA, no object is detected by the detection circuit 4 in any one of periods T1 to T3.

After this sensing operation, the sensing operation of the touch-detection device TD transitions to the next sensing operation. The next sensing operation may be executed immediately after the immediately preceding sensing operation, or may be executed after a predetermined wait time.

FIG. 4 is a view illustrating an example of the sensing operation in a case in which there is an object which is in contact with, or in close proximity to, the detection area SA. In the example of FIG. 4, the case is assumed in which an object is in contact with a position extending over driving electrodes TX6, TX7 and TX8 on the detection area SA.

The sensing operation illustrated in FIG. 4 includes operations which are executed in periods T1 to T7. Periods T1 to T7 are, for example, periods of the same length. In period T1, as in the example of FIG. 3, the sensor driver 3 simultaneously supplies the driving signal Stx to driving electrodes TX1 to TX4 which constitute block BL1, and the detection circuit 4 reads the detection signal Srx from detection electrodes RX1 to RXm.

In addition, in period T2 following period T1, as in the example of FIG. 3, the sensor driver 3 simultaneously supplies the driving signal Stx to driving electrodes TX5 to TX8 which constitute block BL2, and the detection circuit 4 reads the detection signal Srx from detection electrodes RX1 to RXm. At this time, the detection circuit 4 can detect the object O, based on the detection signal Srx obtained from the detection electrodes RX which are in close proximity to the object O. The detection circuit 4 notifies the sensor driver 3 of the detection of the object O.

Responding to the notification of the detection of the object O, the sensor driver 3 individually supplies the driving signal Stx to driving electrodes TX5 to TX8 which constitute block BL2. Specifically, the sensor driver 3 supplies a driving signal Stx to driving electrode TX5 in period T3 following period T2, supplies a driving signal Stx to driving electrode TX6 in period T4 following period T3, supplies a driving signal Stx to driving electrode TX7 in period T5 following period T4, and supplies a driving signal Stx to driving electrode TX8 in period T6 following period T5.

In periods T3 to T6, in synchronism with the supply of the driving signals Stx to driving electrodes TX5 to TX8, the detection circuit 4 reads detection signals Srx from detection electrodes RX1 to RXm, and detects the position of the object O.

In period T7 following period T6, the sensor driver 3 simultaneously supplies the driving signal Stx to driving electrodes TX9 to TX12 which constitute block BL3. In addition, in synchronism with the supply of the driving signal Stx to driving electrodes TX9 to TX12, the detection circuit 4 reads the detection signal Srx from detection electrodes RX1 to RXm. In the example of FIG. 4, since the object O is not present at the position corresponding to driving electrodes TX9 to TX12, no object is detected by the detection circuit 4 in period T7.

After this sensing operation, the sensing operation of the touch-detection device TD transitions to the next sensing operation. The next sensing operation may be executed immediately after the immediately preceding sensing operation, or may be executed after a predetermined wait time.

In addition, in the next sensing operation, taking into account a high possibility that the object will be detected once again in the block BL in which the object was detected in the immediately preceding sensing operation, the driving signal Stx may be supplied to only the driving electrodes TX constituting this block BL. In this case, in the sensing operation following the sensing operation illustrated in FIG. 4, the operation corresponding to periods T3 to T6 in FIG. 4 is executed, but the operation corresponding to periods T1, T2 and T7 is not executed.

Figure 5:
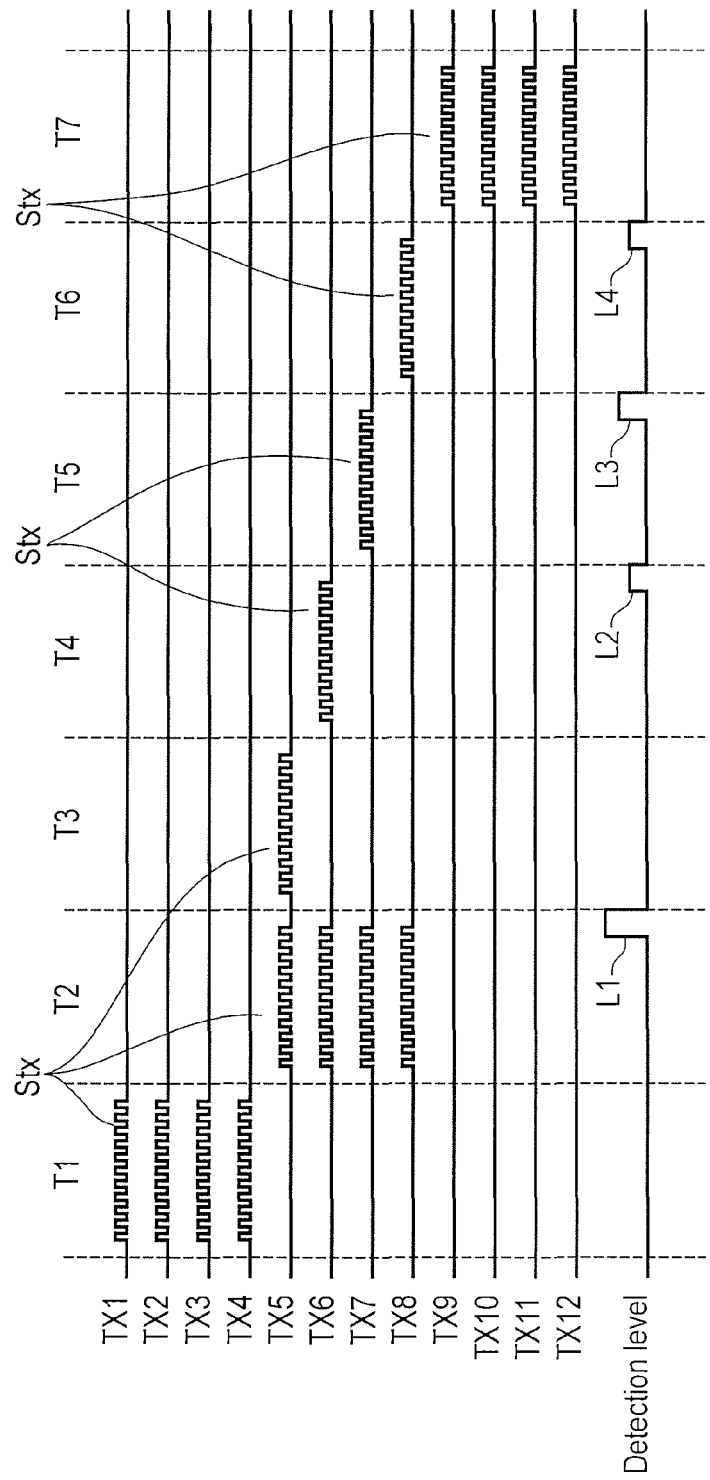
FIG. 5 is a timing chart illustrating driving signals which are supplied to driving electrodes in the sensing operation of FIG. 4.

FIG. 5 is a timing chart illustrating driving signals Stx which are supplied to driving electrodes TX1 to TX12 in the sensing operation of FIG. 4, and a detection level. The detection level is a numerical value, which the detection circuit 4 calculates, for example, based on the detection signals Srx obtained from detection electrodes RX1 to RXm. The value of the detection level becomes higher, as the object O is closer to the driving electrode TX to which the driving signal Stx has been supplied.

In the example of FIG. 5, the driving signals Stx, which are supplied in respective periods T1 to T7, are all composed of a plurality of rectangular pulses of the same shape. The timings of the start of supply of the driving signals Stx, which are simultaneously supplied to driving electrodes TX1 to TX4 in period T1, are coincident, and the timings of the end of supply of these driving signals Stx are also coincident. Similarly, the timings of the start of supply and the timings of the end of supply are coincident, as regards the driving signals Stx which are simultaneously supplied to driving electrodes TX5 to TX8 in period T2, and the driving signals Stx which are simultaneously supplied to driving electrodes TX9 to TX12 in period T7.

In period T2, since the object O is detected, a detection level L1 of a certain magnitude is obtained. However, since driving electrodes TX5 to TX8 are simultaneously driven in period T2, the exact position of the object O on the detection area SA cannot be detected.

Since the object O exits at a position corresponding to driving electrodes TX6 to TX8 on the detection area SA, detection levels L2, L3 and L4 are respectively obtained in periods T4 to T6 in which the driving signal Stx is individually supplied to driving electrodes TX6 to TX8. These detection levels L2 to L4 indicate different values depending on, for example, the distance between the object O and the driving electrode, TX6 to TX8, and the area in which the object O faces the driving electrode, TX6 to TX8. Based on such differences among detection levels L2 to L4, the detection circuit 4 can detect (calculate) the exact position of the object O in the direction of arrangement of the driving electrodes TX, namely in the second direction Y. In the meantime, the position of the object O in the first direction X can be detected (calculated) based on the respective detection signals Srx obtained from detection electrodes RX1 to RXm in periods T4 to T6.

In FIG. 4 and FIG. 5, the case is assumed in which the object is in contact with only one location on the detection area SA. However, it is possible that a plurality of objects are in contact with, or in close proximity to, the detection area SA at the same time. Furthermore, it is possible that these objects are located on areas corresponding to different blocks BL. In such cases, for example, immediately after sensing of the respective blocks BL in which the objects were detected, individual sensing is executed by the driving electrodes of these blocks BL, respectively.

In the above-described embodiment, the sensor driver 3 simultaneously supplies a driving signal Stx to a plurality of first sensors (a plurality of sensors SE including driving electrodes TX5 to TX8) in a first period (period T2), simultaneously supplies the driving signal Stx to a plurality of second sensors (a plurality of sensors SE including driving electrodes TX9 to TX12) in a second period (period T3) following the first period, when the object was not detected in the first period, and successively supplies the driving signal Stx to the first sensors in the second period (periods T3 to T6), when the object was detected in the first period. Further, when the object was detected in the first period, the sensor driver 3 simultaneously supplies the driving signal Stx to the plurality of second sensors in a third period (period T7) following the second period.

For example, paying attention to blocks BL2 and BL3 in the example of FIG. 3 and FIG. 4, the above-described first sensors correspond to a plurality of sensors SE including driving electrodes TX5 to TX8, the second sensors correspond to a plurality of sensors SE including driving electrodes TX9 to TX12, and the first period corresponds to period T2. In addition, the second period in the case in which the object was not detected in the first period corresponds to period T3, the second period in the case in which the object was detected in the first period corresponds to periods T3 to T6, and the third period corresponds to period T7.

In addition, the driving signal Stx may be successively supplied once again to the driving electrodes TX constituting the block BL in which the object was detected in a certain sensing operation, as described above, in a sensing operation following this certain sensing operation. Specifically, when the object was detected by supplying the driving signal Stx to the respective first sensors in the first period, the sensor driver 3 may successively supply the driving signal Stx to the respective first sensors in the second period following the first period, and may further successively supply once again the driving signals Stx to the respective first sensors in the third period following the second period.

According to this touch-detection device TD, the time that is needed for sensing of the detection area SA can be shortened, while the detection precision is maintained. This operational function will be described with reference to FIG. 6.

Figure 6:
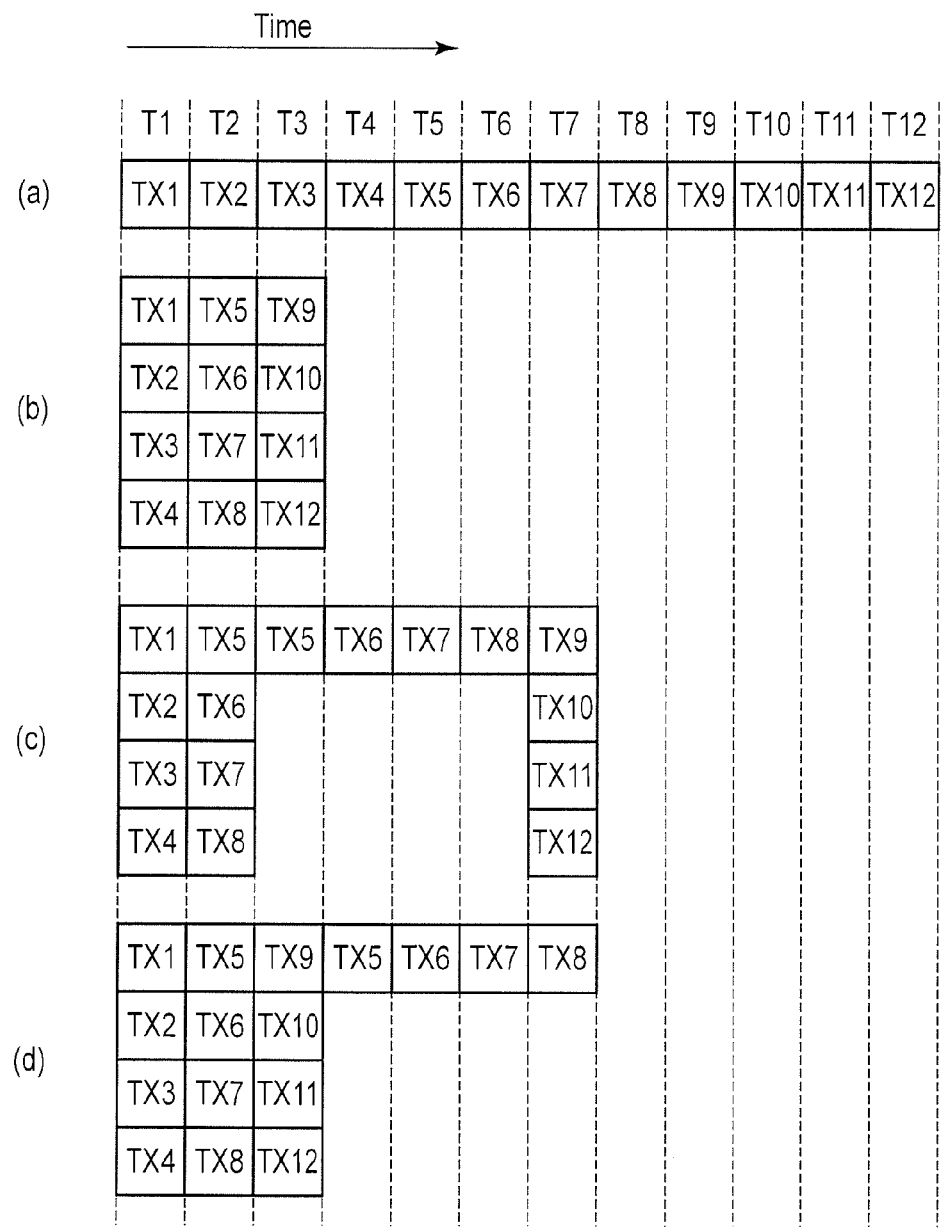
FIG. 6 is a view for describing an example of an operational function of the first embodiment.

FIG. 6 illustrates four patterns (a, b, c and d) of the relationship between time-series periods T and driving electrodes TX1 to TX12 to which driving signals Stx are supplied in the respective periods T.

Pattern a is a comparative example for comparison with the present embodiment. In pattern a, driving signals Stx are individually supplied to driving electrodes TX1 to TX12. Thus, until completing the sensing of the entirety of the detection area SA, the same number of periods T1 to T12 as the number of driving electrodes TX1 to TX12 are necessary. In pattern a, driving signals Stx are individually supplied to driving electrodes TX1 to TX12, an object, which is in contact with, or in close proximity to, the detection area SA, can be detected with high precision.

Pattern b corresponds to the sensing operation described with reference to FIG. 3, in the case in which there is no object which is in contact with, or in close proximity to, the detection area SA. In this sensing operation, the driving signal Stx is simultaneously supplied to each of blocks BL1 to BL3 of driving electrodes TX1 to TX4, driving electrodes TX5 to TX8, and driving electrodes TX9 to TX12. Thus, the entirety of the detection area SA can be sensed during the three periods T1 to T3.

Pattern c corresponds to the sensing operation described with reference to FIG. 4, in the case in which there is an object which is in contact with, or in close proximity to, the detection area SA. In this sensing operation, periods T1 to T7 are needed. In periods T1 to T7, periods for driving the driving electrodes TX (in FIG. 6, driving electrodes TX5 to TX8 of block BL2) of the block BL, in which the object was detected, are added to the periods for supplying the driving signal Stx to driving electrodes TX1 to TX4, driving electrodes TX5 to TX8, and driving electrodes TX9 to TX12.

As is clear from the comparison between pattern a and patterns b and c, in the touch-detection method of the touch-detection device TD according to the present embodiment, compared to the case in which the driving signal Stx is successively supplied to driving electrodes TX1 to TX12, the time that is needed for a one-time sensing operation for sensing the entirety of the detection area SA can be shortened. Furthermore, since the time that is needed for the one-time sensing operation is shortened, the cycle of repetitive execution of the sensing operation can be shortened, thus contributing to enhancement of the detection sensitivity of the touch-detection device TD.

As regards that part of the detection area SA, with or to which the object is in contact or in close proximity, the respective driving electrodes TX of the block BL corresponding to this part are individually driven, and thus the same detection precision as in pattern a can be obtained.

Incidentally, the advantageous effects relating to the decrease of the time necessary for the sensing operation and the increase of the detection sensitivity can further be enhanced by executing, immediately after an object was detected by sensing by any one of the blocks BL, individual sensing by each driving electrode TX of this block BL.

Specifically, as in the sensing operation of pattern d of FIG. 6, there is a case in which, after the one-time sensing in units of the block BL unit is completed, individual sensing is executed by the respective driving electrodes TX (in FIG. 6, driving electrodes TX5 to TX8 of block BL2) of the block BL in which the object was detected. In this case, the detection sensitivity deteriorates since a time difference occurs between the sensing in units of the block BL and the individual sensing by each driving electrode TX. In addition, if the object moves to an area corresponding to another block BL during this time, it is possible that the position cannot exactly be detected. By contrast, in the sensing operation illustrated in pattern c, since such a time difference does not occur, good detection sensitivity and good detection precision can be obtained.

Figure 8:
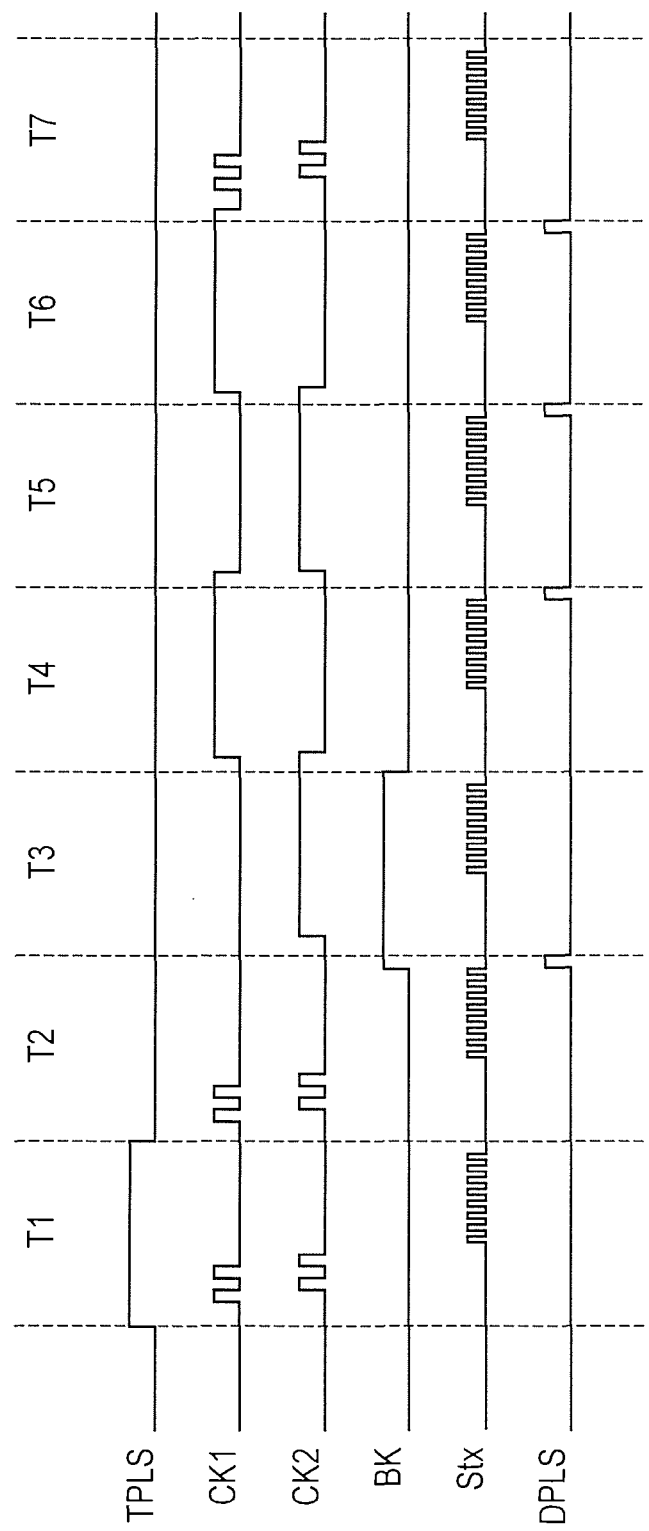
FIG. 8 is a timing chart for describing the operation of the sensor driver.

Next, referring to FIG. 7 and FIG. 8, a description is given of an embodiment of the sensor driver 3 which realizes the touch-detection method according to the present embodiment.

FIG. 7 is a view illustrating an example of a circuit configuration which is applicable to the sensor driver 3. In FIG. 7, as in the example of FIG. 3 and FIG. 4, the case is assumed in which the touch-detection device TD includes 12 (n=12) driving electrodes TX1 to TX12, driving electrodes TX1 to TX4 constitute block BL1, driving electrodes TX5 to TX8 constitute block BL2, and driving electrodes TX9 to TX12 constitute block BL3.

The sensor driver 3 includes a driving IC 10 functioning as a signal supply source, a select circuit 20 functioning as a selector, and a control circuit 30 functioning as a controller.

The select circuit 20 includes switching elements SW1 to SW12. Switching elements SW1 to SW12 are connected to driving electrodes TX1 to TX12 via lead lines LA1 to LA12, respectively, and are connected to the driving IC 10 via a signal line SL1. Switching elements SW1 to SW12 are switched between a first state (ON) in which signal line SL1 and driving electrodes TX1 to TX12 are electrically connected, and a second state (OFF) in which signal line SL1 and driving electrodes TX1 to TX12 are not electrically connected.

The control circuit 30 includes a scanner unit 31 and a transfer control unit 32. The scanner unit 31 includes switching control elements SC1 to SC12. Switching control elements SC1 to SC12 are connected to switching elements SW1 to SW12, and connected to the driving IC 10 via signal lines SL2 and SL3.

The switching control element, SC1 to SC12, is also connected to a next-stage switching control element SC. The "next-stage switching control element SC" means a switching control element SCi+1 in relation to a switching control element SCi (i=1 to 12).

In addition, switching control element SC1, which is the uppermost-stage switching control element SC, is connected to the driving IC 10 via a signal line SL4.

The transfer control unit 32 includes transfer control elements TC1, TC2 and TC3 which are provided for blocks BL1, BL2 and BL3, respectively. Transfer control element TC1 is interposed between switching control element SC4 and switching element SW4, and between switching control element SC4 and the next-stage switching control element SC5, and is connected to these switching control elements SC4 and SC5 and switching element SW4. In addition, transfer control element TC1 is connected to switching control element SC1 which is the uppermost-stage switching control element SC of block BL1, and connected to the detection circuit 4 via a signal line SL5. Signal line SL5 is also connected to the driving IC 10.

Transfer control element TC2 is interposed between switching control element SC8 and switching element SW8, and between switching control element SC8 and the next-stage switching control element SC9, and is connected to these switching control elements SC8 and SC9 and switching element SW8. In addition, transfer control element TC2 is connected to switching control element SC5 which is the uppermost-stage switching control element SC of block BL2, and connected to signal line SL5.

Transfer control element TC3 is interposed between switching control element SC12 and switching element SW12, and is connected to switching control element SC12 and switching element SW12. In addition, transfer control element TC3 is connected to switching control element SC9 which is the uppermost-stage switching control element SC of block BL3, and connected to signal line SL5.

The driving IC 10 supplies a driving signal Stx to signal line SL1, supplies a transfer pulse TPLS to signal line SL4, and supplies clocks (clock pulses) CK1 and CK2 to signal lines SL2 and SL3 for transferring the transfer pulse TPLS between switching control elements SC1 to SC12. The detection circuit 4 supplies a detection pulse DPLS to signal line SL5, when the detection circuit 4 has detected an object which is in contact with, or in close proximity to, the detection area SA.

Transfer control element TC1 outputs back signal BK to switching control element SC1, when the transfer pulses TPLS from switching control element SC4 and the detection pulse DPLS from signal line SL5 are input. Transfer control element TC2 outputs back signal BK to switching control element SC5, when the transfer pulses TPLS from switching control element SC8 and the detection pulse DPLS from signal line SL5 are input. Transfer control element TC3 outputs back signal BK to switching control element SC9, when the transfer pulses TPLS from switching control element SC12 and the detection pulse DPLS from signal line SL5 was input. By the back signals BK from transfer control elements TC1, TC2 and TC3, the transfer pulses TPLS are returned to switching control elements SC1, SC5 and SC9 respectively.

Switching control elements SC1 to SC12 are latch circuits which latch the transfer pulse TPLS which is supplied from signal line SL4. While the switching control element, SC1 to SC12, is latching the transfer pulse TPLS, the switching control element, SC1 to SC12, supplies an ON signal to the switching element, SW1 to SW12. If the switching control element, SC1 to SC12, latches the transfer pulse TPLS, the switching control element, SC1 to SC12, keeps the supply of the ON signal to the switching control element, SC1 to SC12, during one period T. When either clock CK1 or clock CK2 has been input to the switching control element, SC1 to SC11, the switching control element, SC1 to SC11, transfers the transfer pulse TPLS to the next-stage switching control element SC.

The operation of the sensor driver 3 with the above-described structure is described with reference to a timing chart of FIG. 8. Periods T1 to T7 shown in FIG. 8 correspond to periods T1 to T7 shown in FIG. 4 and FIG. 5.

In period T1, the driving IC 10 outputs the transfer pulse TPLS to signal line SL4, and alternately outputs, in succession, two clocks CK1 and two clocks CK2 each having a small pulse width to signal lines SL2 and SL3. Thereby, the transfer pulse TPLS is successively transferred to switching control elements SC1 to SC4, and reaches transfer control element TC1, and switching control elements SC1 to SC4 turn on switching elements SW1 to SW4, respectively.

Specifically, upon the input of a first clock CK1, switching control element SC1 latches the transfer pulse TPLS which is supplied via signal line SL4, and supplies the transfer pulse TPLS to switching control element SC2. Upon the input of a first clock CK2 following the first clock CK1, switching control element SC2 latches the transfer pulse TPLS which is supplied from switching control element SC1, and supplies the transfer pulse TPLS to switching control element SC3. Upon the input of a second clock CK1 following the first clock CK2, switching control element SC3 latches the transfer pulse TPLS which is supplied from switching control element SC2, and supplies the transfer pulse TPLS to switching control element SC4. Upon the input of a second clock CK2 following the second clock CK1, switching control element SC4 latches the transfer pulse TPLS which is supplied from switching control element SC3, and supplies the transfer pulse TPLS to transfer control element TC1. Although transfer control element TC1 supplies this transfer pulse TPLS to switching control element SC5, switching control element SC5 does not latch the transfer pulse TPLS since the supply of clocks CK1 and CK2 has already ended in period T1.

In this manner, switching control elements SC1 to SC4, which have latched the transfer pulse TPLS, supply ON signals to switching elements SW1 to SW4, respectively, and switching elements SW1 to SW4 are turned on by the ON signals.

After the output of clocks CK1 and CK2, the driving IC 10 supplies the driving signal Stx to signal line SL1. This driving signal Stx is simultaneously supplied to driving electrodes TX1 to TX4 via the on-state switching elements SW1 to SW4. Since the two clocks CK1 and two clocks CK2 each having a small pulse width are supplied in a very short period, switching control elements SC1 to SC4 simultaneously latch the transfer pulse TPLS in period T1, and driving electrodes TX1 to TX4 are simultaneously driven.

When the detection circuit 4 could not detect an object in period T1, the driving IC 10 alternately outputs, in succession, two clocks CK1 and two clocks CK2 each having a small pulse width to signal lines SL2 and SL3 in period T2. Thereby, by the same process as in the case of switching control elements SC1 to SC4 in period T1, the transfer pulse TPLS, which reached transfer control element TC1 in period T1, is successively transferred to switching control elements SC5 to SC8 and reaches transfer control element TC2, and switching control elements SC5 to SC8 turn on switching elements SW5 to SW8, respectively. In the meantime, switching control elements SC1 to SC4, which latched the transfer pulse TPLS in period T1, releases (refreshes) the latch of the transfer pulse TPLS, responding to the input of clocks CK1 and CK2 in period T2.

After the output of clocks CK1 and CK2, the driving IC 10 supplies the driving signal Stx to signal line SL1. This driving signal Stx is simultaneously supplied to driving electrodes TX5 to TX8 via the on-state switching elements SW5 to SW8.

When the detection circuit 4 detected an object in period T2, the detection circuit 4 outputs the detection pulse DPLS to signal line SL5. This detection pulse DPLS is input to transfer control elements TC1 to TC3, which are connected to signal line SL5, and is input to the driving IC 10. Responding to the input of both the transfer pulse TPLS and detection pulse DPLS in period T2, transfer control element TC2 returns the transfer pulse TPLS to switching control element SC5 by the back signal BK.

Responding to the input of the detection pulse DPLS, the driving IC 10 alternately outputs clocks CK2 and clocks CK1 each having a large pulse width to signal lines SL3 and SL2 in periods T3 to T6.

Switching control elements SC6 to SC8, which latched the transfer pulse TPLS in period T2, releases the latch of the transfer pulse TPLS, responding to the input of clock CK2 in period T3. On the other hand, switching control element SC5, to which the transfer pulse TPLS (back signal BK) was supplied from transfer control element TC2 and clock CK2 was input in period T3, keeps the latch of the transfer pulse TPLS, supplies the transfer pulse TPLS to switching control element SC6, and releases the latch of the transfer pulse TPLS in response to the input of clock CK1 in period T4. Responding to the input of clock CK1 in period T4, switching control element SC6 latches the transfer pulse TPLS from switching control element SC5, and supplies the transfer pulse TPLS to switching control element SC7. Responding to the input of clock CK2 in period T5, switching control element SC6 releases the latch of the transfer pulse TPLS. Responding to the input of clock CK2 in period T5, switching control element SC7 latches the transfer pulse TPLS from switching control element SC6, and supplies the transfer pulse TPLS to switching control element SC8. Responding to the input of clock CK1 in period T6, switching control element SC7 releases the latch of the transfer pulse TPLS. Responding to the input of clock CK1 in period T6, switching control element SC8 latches the transfer pulse TPLS from switching control element SC7, and supplies the transfer pulse TPLS to transfer control element TC2. Transfer control element TC2 supplies this transfer pulse TPLS to switching control element SC9.

In this manner, in periods T3 to T6, switching control elements SC5 to SC8 successively latch the transfer pulse TPLS. While latching the transfer pulse TPLS, switching control elements SC5 to SC8 supply ON signals to switching elements SW5 to SW8. Specifically, in periods T3 to T6, switching elements SW5 to SW8 are successively turned on.

The driving IC 10 supplies the driving signal Stx to signal line SL1 in each of periods T3 to T6. In periods T3 to T6, the driving signal Stx is successively supplied to driving electrodes TX5 to TX8 via switching elements SW5 to SW8.

In period T7 after the individual sensing by driving electrodes TX5 to TX8 was completed in this manner, the driving IC 10 alternately outputs, in succession, two clocks CK1 and two clocks CK2 each having a small pulse width to signal lines SL2 and SL3. Thereby, the transfer pulse TPLS, which reached transfer control element TC2 in period T6, is successively transferred to switching control elements SC9 to SC12, and reaches transfer control element TC3, by the same process as in the case of switching control elements SC1 to SC4 in period T1, and switching control elements SC9 to SC12 turn on switching elements SW9 to SW12, respectively. In the meantime, switching control element SC8, which latched the transfer pulse TPLS in period T6, releases the latch of the transfer pulse TPLS, responding to the input of clocks CK1 and CK2 in period T7.

After the output of clocks CK1 and CK2, the driving IC 10 supplies the driving signal Stx to signal line SL1. This driving signal Stx is simultaneously supplied to driving electrodes TX9 to TX12 via the on-state switching elements SW9 to SW12.

When no object was detected by the detection circuit 4 in period T7, the series of sensing operations for the detection area SA is completed.

The sensing operation by the touch-detection device TD of the present embodiment can be executed by the simple circuit configuration as in the above embodiment, and can thus be easily realized. This advantageous effect is described, for example, by comparison with the sensing operation illustrated in pattern d of FIG. 6. In the sensing operation illustrated in pattern d of FIG. 6, after the one-time sensing in units of the block BL has been completed, individual sensing by the driving electrodes TX near the position at which the object was detected is executed. In this sensing operation, the following procedure is necessary. For example, if an object is detected in the sensing in units of the block BL, a general position of the object is calculated, and the coordinates of the position are stored in the memory. After the one-time sensing in units of the block BL was completed, the coordinates stored in the memory are read out, and the driving electrodes TX near the position indicated by the read-out coordinates are individually sensed. By contrast, the sensing operation by the touch-detection device TD of the present embodiment can be realized by the circuit configuration which includes neither a processor for calculating the position of the object detected in the sensing in units of the block BL, nor a memory which stores a result of this calculation.

Incidentally, the sensor driver 3 can be realized not only by the circuit configuration according to the above embodiment, but also by various other circuit configurations.

Second Embodiment

A second embodiment will be described. This embodiment discloses a display device having a touch-detection function including a function of sensing by the same touch-detection method as in the touch-detection device according to the first embodiment. This display device having a touch-detection function can be used in various devices such as a smartphone, a tablet computer, a mobile phone, a notebook computer, or a games console.

Incidentally, in the present embodiment, the case is illustrated in which a display panel that is included in the display device having a touch-detection function is a liquid crystal display panel including a liquid crystal layer as a display element. However, the display panel, which the display device having a touch-detection function includes, is not limited to the liquid crystal display panel. Display panels including other kinds of display elements are applicable, such as a self-luminous display panel including an organic electroluminescent display element, etc., or an electronic paper display panel including an electrophoretic element, etc.

FIG. 9 is a view which schematically illustrates a configuration example of a display device having a touch-detection function. A display device having a touch-detection function DSP (hereinafter referred to as a "display device DSP"), which is illustrated, includes a liquid crystal display panel PNL including a display area DA in which an image is displayed.

The liquid crystal display panel PNL includes therein n driving electrodes TX (TX1 to TXn) which are disposed in the display area DA. In the example of FIG. 9, driving electrodes TX1 to TXn extend in strip shapes in the first direction X in the display area DA, and are arranged in the second direction Y. In addition, the display device DSP includes m of detection electrodes RX (RX1 to RXm) which are disposed on a principal surface PNLa of the liquid crystal display panel PNL. In the example of FIG. 9, detection electrodes RX1 to RXm extend in strip shapes in the second direction Y in the display area DA, and are arranged in the first direction X. Driving electrodes TX1 to TXn and detection electrodes RX1 to RXm are formed of a transparent, electrically conductive material such as ITO or IZO.

In the meantime, one driving electrode TX and one detection electrode RX constitute a sensor SE that is a basic unit of sensing.

The display device DSP further includes a sensor driver 3, a detection circuit 4, a display IC 5, a gate driver 6, and a source driver 7. The sensor driver 3 is connected to driving electrodes TX1 to TXn via lead lines LA (LA1 to LAn). The detection circuit 4 is connected to detection electrodes RX1 to RXm via lead lines LB (LB1 to LBm).

The gate driver 6 selectively supplies gate signals to gate lines G connected to switching elements, which are included in multiple subpixels (subpixels PXR, PXG, PXB to be described later) included in the display area DA. The source driver 7 selectively supplies source signals to source lines S which are connected to the switching elements of the many subpixels.

The display IC 5 controls the sensor driver 3, detection circuit 4, gate driver 6 and source driver 7, thereby realizing a function of displaying an image in the display area DA, and a function of detecting an object which is in contact with, or in close proximity to, the display area DA.

Figure 10:
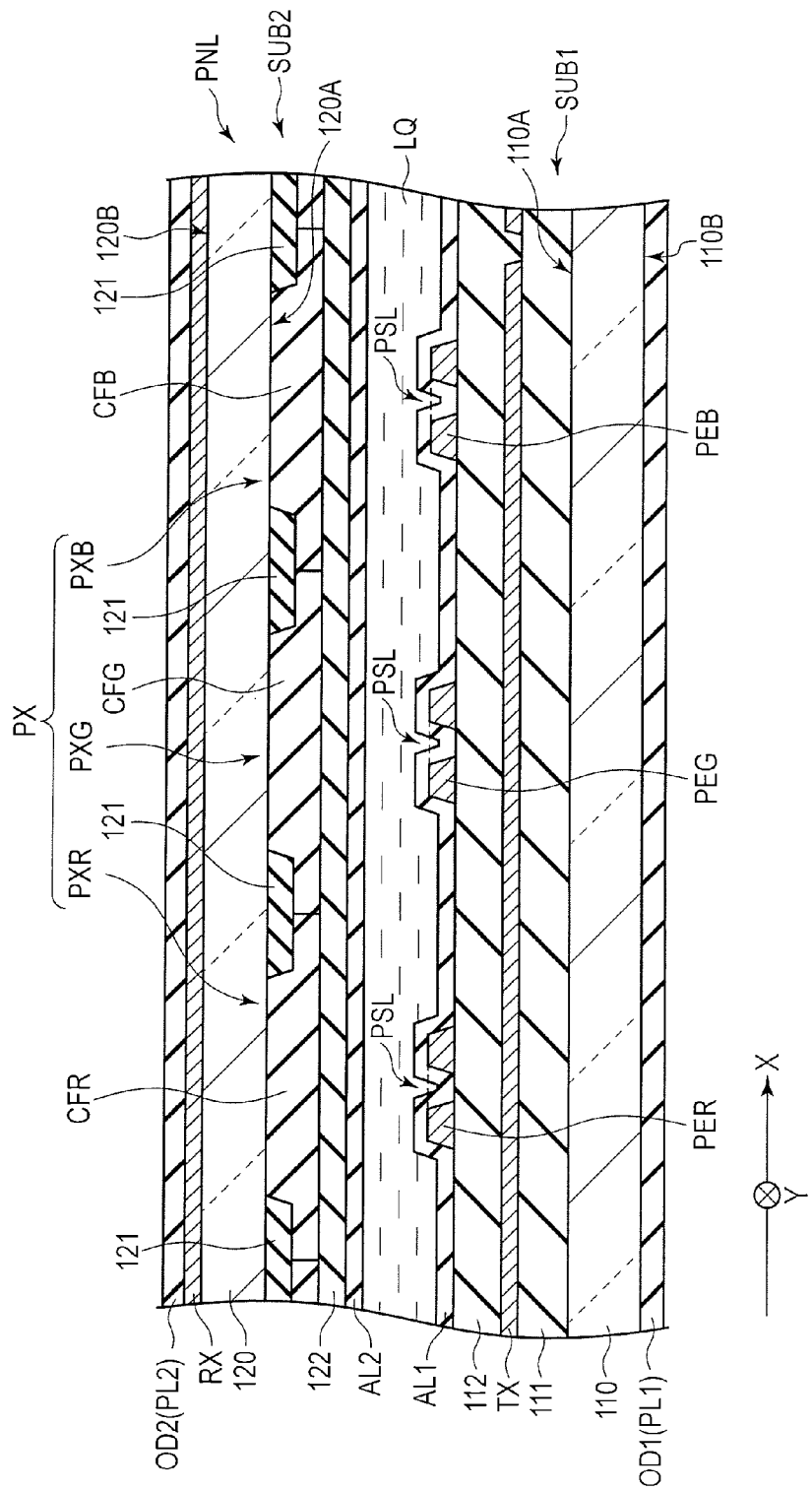
FIG. 10 is a cross-sectional view which schematically illustrates a configuration example of a liquid crystal display panel which the display device having a touch-detection function includes.

FIG. 10 is a cross-sectional view which schematically illustrates a configuration example of the liquid crystal display panel PNL. The liquid crystal display panel PNL includes a pixel (pixel area) PX. The pixel PX is a minimum unit which constitutes a color image that is displayed in the display area DA.

In the example of FIG. 10, a configuration of the pixel PX, in which subpixels (subpixel areas) PXR, PXG and PXB corresponding to red, green and blue respectively, are arranged in the first direction X, is illustrated. Many such pixels PX are arrayed in a matrix in the display area DA. Incidentally, the pixel PX may include a subpixel of a color other than red, green and blue, such as a subpixel corresponding to white.

The liquid crystal display panel PNL includes a first substrate SUB1, a second substrate SUB2 which is disposed to be opposed to the first substrate SUB1, and a liquid crystal layer LQ which is held between the first substrate SUB1 and second substrate SUB2.

The first substrate SUB1 includes a first insulative substrate 110 such as a light-transmissive glass substrate or resin substrate. The first insulative substrate 110 includes a first principal surface 110A which is opposed to the second substrate SUB2, and a second principal surface 110B which is located on an opposite side to the first principal surface 110A.

In addition, the first substrate SUB1 includes a first insulation layer 111 covering the first principal surface 110A of the first insulative substrate 110, the above-described driving electrodes TX (TX1 to TXn) disposed on the first insulation layer 111, and a second insulation layer 112 covering the driving electrodes TX.

Furthermore, the first substrate SUB1 includes pixel electrodes PER, PEG and PEB corresponding to the subpixels PXR, PXG and PXB, respectively, and a first alignment film AL1 which covers the pixel electrodes PER, PEG and PEB and second insulation layer 112 and is in contact with the liquid crystal layer LQ. The driving electrodes TX and the pixel electrodes PER, PEG and PEB are opposed via the second insulation layer 112. In the example of FIG. 10, the pixel electrode PER, PEG, PEB includes a slit PSL. The pixel electrode PER, PEG, PEB is formed of a transparent, electrically conductive material such as ITO or IZO.

On the other hand, the second substrate SUB2 includes a second insulative substrate 120 such as a light-transmissive glass substrate or resin substrate. The second insulative substrate 120 includes a first principal surface 120A which is opposed to the first substrate SUB1, and a second principal surface 120B which is located on an opposite side to the first principal surface 120A.

In addition, the second substrate SUB2 includes color filters CFR, CFG and CFB and a black matrix 121, which are provided on the first principal surface 120A of the second insulative substrate 120.

The color filter CFR is formed of, for example, a resin material which is colored in red, and is disposed in the red subpixel PXR. The color filter CFG is formed of, for example, a resin material which is colored in green, and is disposed in the green subpixel PXG. The color filter CFB is formed of, for example, a resin material which is colored in blue, and is disposed in the blue subpixel PXB.

The black matrix 121 partitions the subpixels PXR, PXG and PXB. Boundaries between the color filters CFR, CFG and CFB are located on the black matrix 121.

Furthermore, the second substrate SUB2 includes a third insulation layer 122 covering the color filters CFR, CFG and CFB and black matrix 121, and a second alignment film AL2 which covers the third insulation layer 122 and is in contact with the liquid crystal layer LQ.

A first optical element OD1 including a first polarizer PL1 is disposed on the second principal surface 110B of the first insulative substrate 110. In addition, the above-described detection electrodes RX (RX1 to RXm) and a second optical element OD2, which covers the detection electrodes RX and includes a second polarizer PL2, are disposed on the second principal surface 120B of the second insulative substrate 120.

In the display device DSP with this structure, driving electrodes TX1 to TXn function as electrodes for detecting an object which is in contact with, or in close proximity to, the display area DA, and also function as electrodes which form an electric field for switching liquid crystal molecules of the liquid crystal layer LQ between driving electrodes TX1 to TXn and the pixel electrodes PER, PEG and PEB. Incidentally, the principle of object detection is as has been described with reference to FIG. 2.

In the meantime, the structure illustrated in FIG. 10 is applicable to, for instance, a liquid crystal display panel PNL of a mode in which a lateral electric field, which is substantially parallel to the substrate principal surface, is utilized for the switching of liquid crystal molecules. However, the mode of the liquid crystal display panel PNL is not limited to the mode utilizing the lateral electric field, and may be a mode in which a vertical electric field, which is parallel to the normal direction of the substrate principal surface, is utilized for the switching of liquid crystal molecules, such as a TN (Twisted Nematic) mode or a VA (Vertical Aligned) mode.

Figure 11:
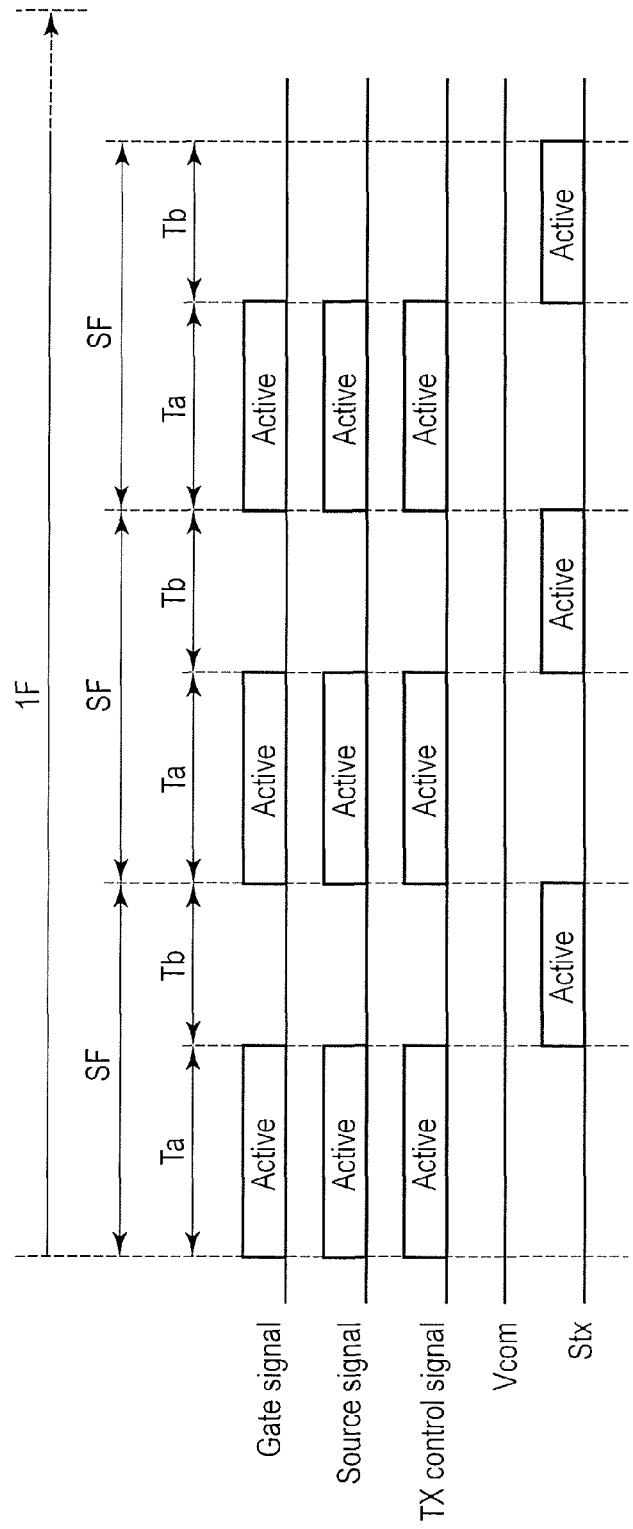
FIG. 11 is a view illustrating an example of an operation cycle relating to display and sensing of the display device having a touch-detection function.

The display device DSP with the above-described structure repeatedly executes operations relating to display and sensing. As illustrated in FIG. 11, a subframe period SF (unit period) corresponding to one cycle of these operations includes a display period Ta and a detection period Tb, and is repeated in a time-series manner. A frame period F for displaying an image of one frame is constituted by a predetermined number of consecutive subframe periods SF.

In the display period Ta, a gate signal and a source signal (video signal) become active, and a common potential Vcom is supplied to driving electrodes TX1 to TXn. Specifically, the gate driver 6 successively supplies gate signals to the gate lines G, and the source driver 7 selectively supplies source signals to the source lines S, thereby displaying an image in the display area DA.

Further, in the display period Ta, a TX control signal for selecting driving electrodes TX, which are to be driven in the detection period Tb, becomes active. Specifically, the display IC 5 supplies the TX control signal (transfer pulse TPLS, clock CK1, clock CK2) to the sensor driver 3, and, based on this TX control signal, the sensor driver 3 selects or determines the driving electrodes TX that are targets of driving in the detection period Tb.

On the other hand, in the detection period Tb, the gate driver 6 and source driver 7 stop the supply of the gate signal and source signal, and the driving signal Stx becomes active. Specifically, the driving signal Stx is supplied from the sensor driver 3 to the driving electrodes TX which were selected in the display period Ta.

The procedure of sensing by the sensor driver 3 and display IC is the same as the procedure of sensing in the first embodiment. Specifically, the sensor driver 3 and display IC simultaneously supply the driving signal Stx to a plurality of first driving electrodes in a first period, simultaneously supply the driving signal Stx to a plurality of second driving electrodes in a second period following the first period, when an object was not detected in the first period, and successively supply the driving signal Stx to the first driving electrodes in the second period following the first period, when the object was detected in the first period. Further, when the object was detected in the first period, the sensor driver 3 simultaneously supplies the driving signal to the plurality of second driving electrodes in a third period following the second period.

For example, paying attention to blocks BL2 and BL3 in FIG. 3 and FIG. 4, the above-described first driving electrodes correspond to driving electrodes TX5 to TX8, the second driving electrodes correspond to driving electrodes TX9 to TX12, and the first period corresponds to the detection period Tb of period T2. In addition, the second period in the case in which the object was not detected in the first period corresponds to the detection period Tb of period T3, the second period in the case in which the object was detected in the first period corresponds to the detection periods Tb of periods T3 to T6, and the third period corresponds to the detection period Tb of period T7.

Here, an embodiment of the sensor driver 3, which is applicable to the present embodiment, is described.

Figure 12:
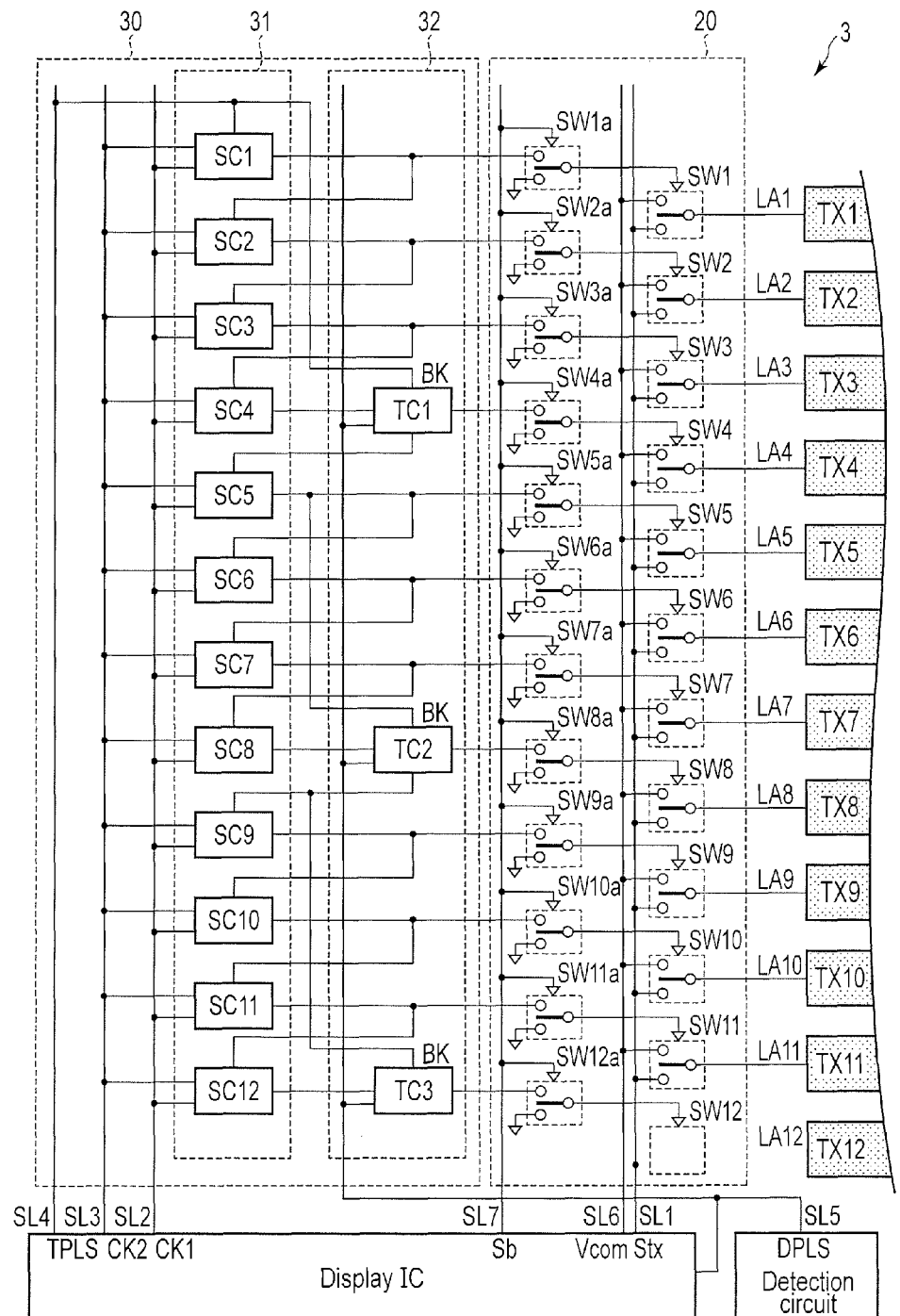
FIG. 12 is a view illustrating an example of a circuit configuration which is applicable to a sensor driver according to the second embodiment.

FIG. 12 is a view illustrating an example of a circuit configuration which is applicable to the sensor driver 3. In FIG. 12, as in the example of FIG. 7, the case is assumed in which the display device DSP includes 12 (n=12) driving electrodes TX1 to TX12, driving electrodes TX1 to TX4 constitute block BL1, driving electrodes TX5 to TX8 constitute block BL2, and driving electrodes TX9 to TX12 constitute block BL3.

The circuit illustrated in FIG. 12 differs from the circuit illustrated in FIG. 7 in that the display IC 5, in place of the driving IC 10, is a supply source of the transfer pulse TPLS, clocks CK1 and CK2, and driving signal Stx, switching elements SW1 to SW12 are connected to the display IC 5 via a signal line SL6, the selector 20 further includes switching elements SW1a to SW12a, and these switching elements SW1a to SW12a are connected to the display IC 5 via a signal line SL7.

Switching elements SW1a to SW12a are provided between switching control elements SC1 to SC12 and switching elements SW1 to SW12, respectively. In the meantime, transfer control elements TC1 to TC3 are interposed between switching control element SC4 and switching element SW4a, between switching control element SC8 and switching element SW8a, and between switching control element SC12 and switching element SW12a.

The display IC 5 supplies a common potential Vcom to signal line SL6. In addition, in the detection period Tb, the display IC 5 supplies a switching signal Sb to signal line SL7.

While the switching signal Sb is being supplied via signal line SL7, switching elements SW1a to SW12a are changed over to a first state (ON), respectively, in which switching control elements SC1 to SC12 and switching elements SW1 to SW12 are electrically connected. On the other hand, while the switching signal Sb is not supplied, switching elements SW1a to SW12a are changed over to a second state (OFF), respectively, in which switching control elements SC1 to SC12 and switching elements SW1 to SW12 are not electrically connected.

While ON signals from switching control elements SC1 to SC12 are being supplied via switching elements SW1a to SW12a, switching elements SW1 to SW12 are changed over to a first state (ON), respectively, in which signal line SL1 and driving electrodes TX1 to TX12 are electrically connected. On the other hand, while the ON signals are not supplied, switching elements SW1 to SW12 are changed over to a second state (OFF), respectively, in which the signal line SL6 and driving electrodes TX1 to TX12 are electrically connected.

The operation of the sensor driver 3 and display IC 5 with the above-described structure is described with reference to FIG. 13 and FIG. 14. As in the case of FIG. 8, periods T1 to T7 shown in FIG. 13 and FIG. 14 correspond to periods T1 to T7 shown in FIG. 4 and FIG. 5. Periods T1 to T7 correspond to the above-described subframe periods SF, respectively, and each of periods T1 to T7 includes the display period Ta and detection period Tb.

FIG. 13 is a timing chart illustrating an example of the operation of the sensor driver 3 and display IC 5. In the display period Ta of period T1, T2, T7 in which sensing in units of block BL1, BL2, BL3 is executed, the display IC 5 alternately outputs, in succession, two clocks CK1 and two clocks CK2 each having a small pulse width to signal lines SL2 and SL3. In addition, in period T3, T4, T5, T6 in which individual sensing by driving electrode TX5, TX6, TX7, TX8 is executed, the display IC 5 starts the supply of a clock CK2 and CK1 with a large pulse width in the display period Ta of each period, T3 to T6. Specifically, in each of periods T1 to T7, the selection of driving electrodes TX, which are targets of supply of the driving signal Stx, is executed in the display period Ta.

In the detection period Tb of each period, T1 to T7, the display IC 5 supplies the switching signal Sb to the switching element, SW1a to SW12a, via signal line SL7. By this switching signal Sb, the switching element, SW1a to SW12a, is turned on. Accordingly, the ON signal, which is supplied from the switching control element that was selected in the display period Ta (that latched the transfer pulse TPLS) among switching control elements SC1 to SC12, is supplied to the corresponding one of switching elements SW1 to SW12 in the detection period Tb. The switching element, among switching elements SW1 to SW12, to which the ON signal was supplied, connects signal line SL1 and the driving electrode TX corresponding to itself.

On the other hand, in the display period Ta, since the switching signal Sb is not supplied from the display IC 5, switching elements SW1a to SW12a are turned off. Accordingly, the ON signal from the switching control element, SC1 to SC12, does not reach the switching element, SW1 to SW12, and all of switching elements SW1 to SW12 are in the state in which switching elements SW1 to SW12 are connected to signal line SL6.

Figure 14:
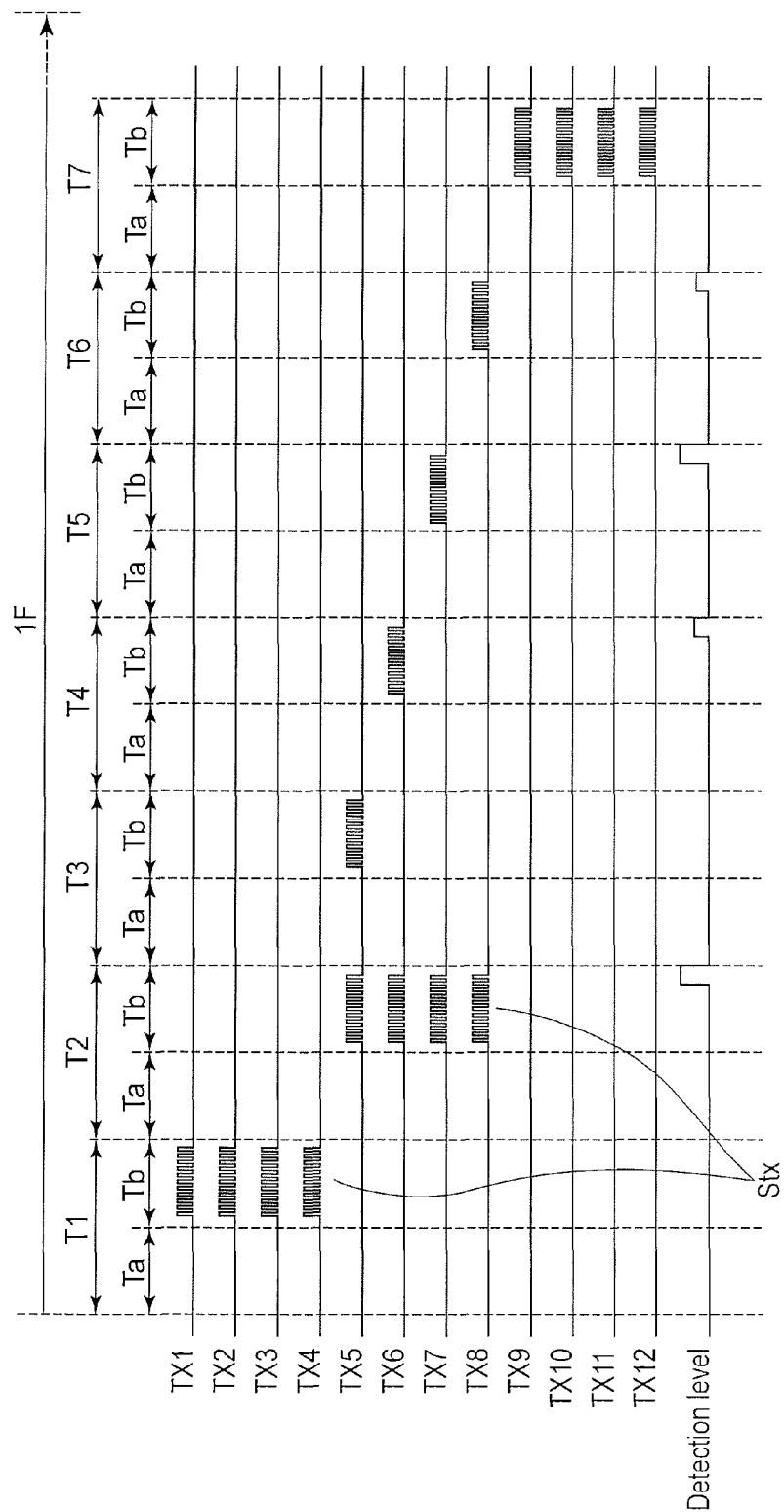
FIG. 14 is a timing chart illustrating driving signals which are supplied to the respective driving electrodes in the operation of FIG. 13.

FIG. 14 is a timing chart illustrating driving signals Stx which are supplied to driving electrodes TX1 to TX12 in the sensing operation of FIG. 13, and a detection level. As in the example of FIG. 5, each of the driving signals Stx, which are supplied in periods T1 to T7, is composed of a plurality of rectangular pulses of the same shape.

In the detection period Tb of each period, T1 to T7, the display IC 5 supplies the driving signal Stx to signal line SL1. This driving signal Stx is supplied to the driving electrode TX which was selected in the display period Ta of the period, T1 to T7. Specifically, in the example of FIG. 13 and FIG. 14, the driving signal Stx is always supplied to the driving electrode TX in the detection period Tb, and is never supplied in the display period Ta.

In the meantime, the sensing operation for completing one-time sensing of the display area DA and the display operation for displaying a single-frame image in the display area DA are not synchronized, and are independently executed. Specifically, the period that is needed for completing one-time sensing of the display area DA does not necessarily coincide with the period that is needed for displaying a single-frame image. For example, as illustrated in FIG. 14, one frame period F (1F) may be longer than periods T1 to T7. In this case, in the frame period F, the next sensing operation is started subsequent to period T7.

According to the above-described embodiment, as in the first embodiment, the time that is needed for sensing of the detection area SA (display area DA) can be shortened, while the detection precision is maintained.

In addition, since the driving electrodes TX are utilized for both display and sensing, there is no need to separately provide electrodes necessary for display and sensing. Thereby, the structure of the display device DSP can be simplified, and the display device DSP can be reduced in size.

Additionally, the driving for display is executed in the display period Ta, and the driving for sensing is executed in the detection period Tb that is different from the display period Ta. It is thus possible to prevent noise occurring in one of the driving of display and the driving of sensing from affecting the other driving.

In addition, with the present embodiment, the same advantageous effects as in the first embodiment can be obtained.

Incidentally, in the sensing operation described in the first and second embodiments, the time that is needed for completing one-time sensing of the detection area varies depending on whether an object, which is in contact with, or in close proximity to, the detection area is detected or not. When it is necessary to make the time of sensing constant, regardless of whether an object is detected or not, it is possible to provide a proper blanking period in a case in which no object is detected. If a description is given by taking FIG. 6 as an example, a blank period, in which sensing is not executed, may be provided over periods T4 to T7 after period T3 of pattern b. Thereby, the times that are needed for the sensing operations of patterns b and c coincide. In this case, since sensing is not executed in the blank period, the power needed for sensing can be reduced, compared to pattern a, for instance.

In addition, in the sensing operation described in the first and second embodiments, immediately after the object was detected in the sensing in units of a block BL, individual sensing is executed by the driving electrodes TX of this block BL. Thereafter, for the residual blocks BL, sensing is executed in units of a block BL. However, after the individual sensing by the driving electrodes TX, sensing may not be executed for the residual blocks BL, and sensing may be executed from the first block BL.

The configurations of the driving electrodes TX and detection electrodes RX are not limited to those illustrated in FIG. 1 and FIG. 9 in the first and second embodiments. For example, the driving electrodes TX and detection electrodes RX may be formed in island shapes, and may be alternately disposed in the first direction X and second direction Y in the same plane. In addition, the material of the driving electrodes TX and detection electrodes RX is not limited to the transparent, electrically conductive material such as ITO or IZO. For example, the detection electrodes RX may be formed of metal wires.

In the first and second embodiments, the touch-detection device and display device, which adopt the method of detecting an object based on a variation in capacitance formed between the driving electrode TX and detection electrode RX, have been described by way of example. However, the operation relating to the sensing disclosed in the first and second embodiments is also applicable to a touch-detection device and a display device which adopt a method (called a self-capacitive sensing method, or the like) of detecting an object based on a variation of a capacitance which one electrode itself has.

For example, in the case of applying the self-capacitive sensing method to the sensors including the detection electrodes RX and driving electrodes TX illustrated in FIG. 1 and FIG. 9, the detection electrodes RX can be made to function as first electrodes (X-axis detection electrodes) for position detection in the first direction X, and the driving electrodes TX can be made to function as second electrodes (Y-axis detection electrodes) for position detection in the second direction Y.

At the time of sensing, for example, if the second electrodes are driven in units of block BL, as illustrated in FIG. 3, and if an object could be detected by any one of the blocks BL, the respective second electrodes constituting this block BL are individually driven, as illustrated in FIG. 4. Thereby, the position of the object in the second direction Y can be specified. Furthermore, by individually driving the respective first electrodes, the position of the object in the first direction X can be specified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

It should be understood that various changes and modifications to the presently preferred embodiments described The invention is claimed as follows:

1. A touch-detection device comprising:
   a plurality of first sensors;
   a plurality of second sensors;
   a driver configured to supply a driving signal to the first sensors and the second sensors; and
   a detection circuit configured to read a detection signal from the first sensors and the second sensors, and to detect an object, which is in contact with, or in close proximity to, a detection area, based on the detection signal,
   wherein the driver includes:
   a supply source of the driving signal and a transfer pulse;
   a plurality of first switching controllers connected in series, and configured to supply the driving signal to the corresponding first sensors when the first switching controllers latch the transfer pulse;
   a plurality of second switching controllers connected in series, and configured to supply the driving signal to the corresponding second sensors when the second switching controllers latch the transfer pulse; and
   a transfer controller configured to control transfer of the transfer pulse,
   the first switching controllers are configured to simultaneously latch the transfer pulse from the supply source and to simultaneously supply the driving signal to the first sensors in a first period,
   if the object was not detected by the detection circuit in the first period, the transfer controller is configured to output the transfer pulse to the second switching controllers, and the second switching controllers are configured to simultaneously latch the transfer pulse from the transfer controller and to simultaneously supply the driving signal to the second sensors in a second period following the first period, and
   if the object was detected by the detection circuit in the first period, the transfer controller is configured to return the transfer pulse to the first switching controllers, and the first switching controllers are configured to sequentially latch the transfer pulse and to sequentially supply the driving signal to the respective first sensors in the second period.

2. The touch-detection device of claim 1, wherein the driver is configured to simultaneously supply, when the object was detected by the detection circuit in the first period, the driving signal to the plurality of second sensors in a third period following the second period.

3. The touch-detection device of claim 1, wherein the driver is configured to successively supply, when the object was detected by the detection circuit in the first period, the driving signal to the respective first sensors once again in a third period following the second period.

4. The touch-detection device of claim 1, wherein the driver is configured to supply the driving signal in a detection period of a unit period which is repeated in a time-series manner,
   the first period includes the detection period of a first unit period,
   the second period in a case in which the object was not detected by the detection circuit in the first period includes the detection period of a second unit period following the first unit period, and
   the second period in a case in which the object was detected by the detection circuit in the first period includes the detection periods of a plurality of unit periods following the first unit period.

5. The touch-detection device of claim 1, wherein in a case in which the object was detected in the first period, the driving signals supplied to the first sensors in the second period have a same waveform.

6. The touch-detection device of claim 1, wherein the driver further comprises:
   a plurality of first switching elements respectively provided between a signal line to which the driving signal is supplied and the first sensors; and
   a plurality of second switching elements respectively provided between the signal line and the second sensors,
   wherein the first switching controllers are configured to control the corresponding first switching elements and to connect the first sensors and the signal line, when the first switching controllers latch the transfer pulse, and
   wherein the second switching controllers are configured to control the corresponding second switching elements and to connect the second sensors and the signal line, when the second switching controllers latch the transfer pulse.

7. A display device having a touch-detection function comprising:
   a display panel including a display element, a plurality of pixel electrodes disposed in a display area, and a plurality of first driving electrodes and a plurality of second driving electrodes which are opposed to the pixel electrodes;
   a detection electrode opposed to the first driving electrodes and the second driving electrodes;
   a detection circuit configured to read a detection signal from the detection electrode, and to detect an object, which is in contact with, or in close proximity to, the display area, based on the detection signal; and
   a driver configured to set, at a time of image display, the first driving electrodes and the second driving electrodes at a common potential for display, and to supply, at a time of detection of the object, a driving signal for detection to the first driving electrodes and the second driving electrodes,
   wherein the driver includes:
   a supply source of the driving signal and a transfer pulse;
   a plurality of first switching controllers connected in series, and configured to supply the driving signal to the corresponding first driving electrodes when the first switching controllers latch the transfer pulse;
   a plurality of second switching controllers connected in series, and configured to supply the driving signal to the corresponding second driving electrodes when the second switching controllers latch the transfer pulse; and
   a transfer controller configured to control transfer of the transfer pulse,
   the first switching controllers are configured to simultaneously latch the transfer pulse from the supply source and to simultaneously supply the driving signal to the first driving electrodes in a first period,
   if the object was not detected by the detection circuit in the first period, the transfer controller is configured to output the transfer pulse to the second switching controllers, and the second switching controllers are configured to simultaneously latch the transfer pulse from the transfer controller and to simultaneously supply the driving signal to the second driving electrodes in a second period following the first period, and if the object was detected by the detection circuit in the first period, the transfer controller is configured to return the transfer pulse to the first switching controllers, and the first switching controllers are configured to sequentially latch the transfer pulse and to sequentially supply the driving signal to the respective first driving electrodes in the second period.

8. The display device having a touch-detection function of claim 7, wherein the driver is configured to set, in a display period of a unit period which includes the display period and a detection period and is repeated in a time-series manner, the first driving electrodes and the second driving electrodes at the common potential, and to supply the driving signal in the detection period.

9. The display device having a touch-detection function of claim 8, wherein the first period includes the detection period of a first unit period, the second period in a case in which the object was not detected by the detection circuit in the first period includes the detection period of a second unit period following the first unit period, and the second period in a case in which the object was detected by the detection circuit in the first period includes the detection periods of a plurality of unit periods following the first unit period.

10. The display device having a touch-detection function of claim 7, wherein the driver is configured to simultaneously supply, when the object was detected by the detection circuit in the first period, the driving signal to the plurality of second driving electrodes in a third period following the second period.

11. The display device having a touch-detection function of claim 7, wherein the driver is configured to successively supply, when the object was detected by the detection circuit in the first period, the driving signal to the respective first driving electrodes once again in a third period following the second period.

12. The display device having a touch-detection function of claim 7, wherein in a case in which the object was detected in the first period, the driving signals supplied to the first driving electrodes in the second period have a same waveform.

13. The display device having a touch-detection function of claim 7, wherein the driver further comprises:

a plurality of first switching elements configured to selectively switch connection destinations of the first driving electrodes between a first signal line to which the driving signal is supplied and a second signal line which is set at a common potential; and a plurality of second switching elements configured to selectively switch connection destinations of the second driving electrodes between the first signal line and the second signal line, wherein the first switching controllers are configured to control the corresponding first switching elements and to connect the first driving electrodes and the first signal line, when the first switching controllers latch the transfer pulse, and wherein the second switching controllers are configured to control the corresponding second switching elements and to connect the second driving electrodes and the first signal line, when the second switching controllers latch the transfer pulse.

\* \* \* \* \*